(12) United States Patent
Wei et al.

(10) Patent No.: US 11,139,931 B2
(45) Date of Patent: Oct. 5, 2021

(54) FLEXIBLE TRANSMISSIONS ON ONE OR MORE FREQUENCY DIVISION DUPLEXING RESOURCES

(71) Applicant: QUALCOMM Incorporated, San Diego, CA (US)

(72) Inventors: Chao Wei, Beijing (CN); Peter Gaal, San Diego, CA (US); Wanshi Chen, San Diego, CA (US); Hao Xu, San Diego, CA (US); Jilei Hou, San Diego, CA (US); Neng Wang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/527,291

(22) PCT Filed: Aug. 12, 2015

(86) PCT No.: PCT/CN2015/086723
§ 371 (c)(1),
(2) Date: May 16, 2017

(87) PCT Pub. No.: WO2016/037516
PCT Pub. Date: Mar. 17, 2016

(65) Prior Publication Data
US 2017/0310435 A1    Oct. 26, 2017

(30) Foreign Application Priority Data
Sep. 8, 2014 (WO) ................ PCT/CN2014/086087

(51) Int. Cl.
*H04W 16/06* (2009.01)
*H04L 5/14* (2006.01)
(Continued)

(52) U.S. Cl.
CPC .......... *H04L 5/0007* (2013.01); *H04L 5/0044* (2013.01); *H04L 5/0053* (2013.01);
(Continued)

(58) Field of Classification Search
CPC ... H04L 5/0007; H04L 5/0044; H04L 5/0053; H04L 5/0091; H04L 5/1469; H04W 16/14; H04W 16/06
See application file for complete search history.

(56) References Cited

U.S. PATENT DOCUMENTS 6,611,507 B1 * 8/2003 Hottinen ........... H04W 36/0066
370/331
9,844,073 B2    12/2017 Ray et al.
(Continued)

FOREIGN PATENT DOCUMENTS

| CN | 102026206 A | 4/2011 |
| CN | 102300213 A | 12/2011 |

(Continued)

OTHER PUBLICATIONS

ISA/CN, International Search Report and Written Opinion of the International Searching Authority, Int'l App. No. PCT/CN2015/086723, dated Oct. 29, 2015, State Intellectual Property Office of the P.R. China, Beijing, CN, 4 pgs.
(Continued)

*Primary Examiner* — Gregory B Sefcheck
*Assistant Examiner* — Joshua Smith
(74) *Attorney, Agent, or Firm* — Holland & Hart LLP

(57) ABSTRACT

Methods, systems, and apparatuses are described for flexible transmissions on one or more frequency division duplexing resources. In some aspects, a subset of resources originally allocated for transmissions in a frequency division duplex (FDD) mode of operation associated with a first base station is identified for reallocation, and the identified subset of
(Continued)

resources is reallocated to transmissions in a time division duplex (TDD) mode of operation, for example, associated with a second base station.

24 Claims, 17 Drawing Sheets

(51) Int. Cl.
  *H04W 16/14* (2009.01)
  *H04L 5/00* (2006.01)
(52) U.S. Cl.
  CPC ......... *H04L 5/0091* (2013.01); *H04L 5/1469* (2013.01); *H04W 16/06* (2013.01); *H04W 16/14* (2013.01)

(56) References Cited

U.S. PATENT DOCUMENTS

| | | | |
|---|---|---|---|
| 2006/0221872 A1* | 10/2006 | Jones | H04B 7/2643 370/276 |
| 2007/0025290 A1 | 2/2007 | Afrashteh et al. | |
| 2008/0165709 A1* | 7/2008 | Soliman | H04W 88/06 370/280 |
| 2010/0227569 A1* | 9/2010 | Bala | H04W 48/12 455/73 |
| 2010/0290369 A1* | 11/2010 | Hui | H04B 7/2656 370/279 |
| 2011/0286370 A1* | 11/2011 | Tang | H04W 72/0446 370/280 |
| 2012/0040674 A1* | 2/2012 | McGilly | H04W 36/0066 455/436 |
| 2012/0163250 A1* | 6/2012 | Chin | H04W 36/0005 370/280 |
| 2013/0083710 A1* | 4/2013 | Chen | H04W 72/042 370/281 |
| 2013/0322302 A1* | 12/2013 | Gholmieh | H04W 36/24 370/280 |
| 2015/0109932 A1* | 4/2015 | Goldhamer | H04L 47/125 370/236 |
| 2015/0341834 A1* | 11/2015 | Lee | H04W 36/0083 370/252 |
| 2016/0043849 A1* | 2/2016 | Lee | H04W 72/042 370/329 |
| 2016/0073391 A1* | 3/2016 | Awad | H04L 1/1822 370/329 |
| 2016/0080133 A1* | 3/2016 | Golitschek Edler von Elbwart H04W 72/0446 370/280 |
| 2016/0204921 A1* | 7/2016 | Kim | H04L 12/189 370/312 |

FOREIGN PATENT DOCUMENTS

| | | |
|---|---|---|
| CN | 102349259 A | 2/2012 |
| CN | 102378374 A | 3/2012 |
| CN | 103190100 A | 7/2013 |
| EP | 2 146 535 A1 | 1/2010 |
| GB | 2412541 A | 9/2005 |
| WO | WO-0007399 A1 | 2/2000 |
| WO | WO-2011085403 A1 | 7/2011 |
| WO | WO-2014061001 A1 | 4/2014 |

OTHER PUBLICATIONS

ISA/CN, International Search Report and Written Opinion of the International Searching Authority, Int'l. App. No. PCT/CN2014/086087, dated May 28, 2015, State Intellectual Property Office of the P.R. China, Beijing, CN, 4 pgs.

Iaesi et al., "Asymmetry-based spectrum utilization and coordination: TDD within FDD [online]", 3GPP TSG-RAN WG1 Meeting #72bis, R1-131356, Apr. 19, 2013, pp. 1-8, Retrieved from the Internet URL:http://www.3gpp.org/ftp/tsg_ran/WG1_RL1/TSGR1_72b/Docs/R1-131356.zip.

Supplementary European Search Report—EP15839501—Search Authority—The Hague—dated Mar. 29, 2018(146104EP).

* cited by examiner

FLEXIBLE TRANSMISSIONS ON ONE OR MORE FREQUENCY DIVISION DUPLEXING RESOURCES

CROSS REFERENCES

The present Application for Patent claims priority to PCT Application No. PCT/CN2014/086087 by Wei et al., entitled "Flexible Transmissions on One or More Frequency Division Duplexing Resources," filed Sep. 8, 2014, which is assigned to the assignee hereof.

BACKGROUND

Field of the Disclosure

The present disclosure relates to wireless communication systems, and more particularly to flexible transmissions on one or more frequency division duplexing resources.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

While the overall demand for wireless communications is growing rapidly, demand is seldom symmetrical or static between uplink and downlink transmission requirements. For example, a user watching a video over a wireless communication link requires much more downlink capacity than uplink capacity. On the other hand, uplink capacity can also surge—such as at certain events where many users simultaneously attempt to upload a relevant picture to share with others.

SUMMARY

The described features generally relate to one or more improved systems, methods, and/or apparatuses for flexible transmissions on one or more frequency division duplex (FDD) resources. One or more resources (e.g., time and/or frequency resources) that are originally allocated for use in an FDD mode of operation may be reallocated to a time division duplex (TDD) mode of operation. In some embodiments, a certain set of resources may originally be allocated for use in uplink (UL) FDD transmissions, but a subset of those resources may be reallocated for downlink (DL) TDD transmissions, with the reallocated TDD DL transmission resources varying over time based on, for example, traffic and/or quality of service (QoS) considerations. In some embodiments, the reallocated DL transmission resources may comprise a plurality of UL subframes and are a subset of the plurality of UL subframes originally allocated for transmissions in UL FDD transmission. In some embodiments, the reallocated DL transmission resources may comprise a number of UL symbols that are originally allocated for UL FDD transmission. In another example, the reallocated DL transmission resources may comprise a subset of the resource blocks originally allocated for physical uplink shared channel (PUSCH) resources. The resources reallocated for TDD DL transmissions may be utilized by a base station to deliver DL traffic to a user equipment (UE), and in some examples, flexible resource allocation may be used to reduce potential sources of interference.

A method for wireless communication is thus described, with the method including identifying for reallocation a subset of resources originally allocated for transmissions in an FDD mode of operation associated with a first base station, and reallocating the identified subset of resources for transmissions in a TDD mode of operation associated with a second base station.

Also, an apparatus for wireless communication is described, with the apparatus including means for identifying for reallocation a subset of resources originally allocated for transmissions in an FDD mode of operation associated with a first base station, and means for reallocating the identified subset of resources for transmissions in a TDD mode of operation associated with a second base station.

Also, another apparatus for wireless communication is described, with the apparatus including a processor, a memory in electronic communication with the processor, and one or more instructions stored in the memory, the one or more instructions being executable by the processor to identify for reallocation a subset of resources originally allocated for transmissions in an FDD mode of operation associated with a first base station, and reallocate the identified subset of resources for transmissions in a TDD mode of operation associated with a second base station.

Also, a non-transitory computer-readable medium for wireless communication in a wireless device is described, the non-transitory computer-readable medium storing computer-executable code for identifying for reallocation a subset of resources originally allocated for transmissions in an FDD mode of operation associated with a first base station, and reallocating the identified subset of resources for transmissions in a TDD mode of operation associated with a second base station.

In some aspects of the method, apparatuses, and/or computer-readable medium, the identified subset of resources may include a center portion of an originally allocated FDD mode UL bandwidth, and the transmissions in the TDD mode of operation associated with the second base station may be TDD mode DL transmissions. In some examples, the identified subset of resources may correspond to one or more originally allocated PUSCH resources. In some aspects, remaining UL resources allocated for transmissions in the FDD mode of operation associated with the first base station may be separated from the identified subset of resources by one or more guard bands. Reallocating the identified subset of resources for transmissions in the TDD mode of operation associated with the second base station may include reallocating the identified subset of resources for DL transmissions in the TDD mode of operation associated with the second base station. In aspects, the second base station may include a pico eNodeB operating on a same carrier frequency as the first base station. Some examples of the method, apparatuses, or computer-readable medium described above may further include processes, features, means, instructions, or code for dynamically reallocating additional resources originally allocated for UL transmissions in the FDD mode of operation associated with the first base station for DL transmissions in the TDD mode of operation associated with the second base station based on a changing traffic demand.

In some aspects, control signaling may be transmitted to a UE that is to receive data via the reallocated subset of resources. The control signaling may be transmitted using UE-specific radio resource control (RRC) signaling and/or L1 signaling. In some aspects, the identifying may include causing a parity of a number of resource blocks in the subset of resources identified for reallocation to be equal to a parity of a number of resource blocks originally allocated for UL transmissions in the FDD mode of operation associated with the first base station. In some aspects, at least one of CRS, CSI-RS, PDCCH or PDSCH of the second base station may be mapped to the reallocated subset of resources.

In some aspects the resources originally allocated for transmissions in the FDD mode of operation associated with the first base station may include a number of UL subframes (e.g., restricted UL subframes), and the identified subset of resources may include a subset of the number of UL subframes (e.g., restricted UL subframes). The subset of the number of UL subframes may correspond to almost blank subframes (ABS) of the number of UL subframes associated with the first base station. In some aspects, the identified subset of resources may correspond to one or more portions of symbols in one UL subframe originally allocated for transmissions in the FDD mode of operation associated with the first base station. In some aspects, a subset of resources may be identified and reallocated for the transmissions from the second base station on a frame-by-frame basis, and/or based on a period of time. In one example, the reallocation may be based at least in part on a reconfiguration period. The reconfiguration period may be determined dynamically with a periodicity of 8 ms, 10 ms, 20 ms, 40 ms, and/or 80 ms, as indicated by higher layer signaling such as L1 signaling. In some cases, a reconfiguration period may be determined semi-statically by RRC signaling. For mixed UL/DL in one subframe, an update of UL/DL ratio may be performed on the subframe basis. In some examples, the identified subset of resources for the transmissions from the second base station may be reallocated on a subframe-by-subframe basis. For example, for mixed UL/DL in one subframe, the update of a UL/DL ratio may be performed on the subframe basis. The reallocation may be based at least in part on one or more of UL control requirements, UL traffic requirements, DL control requirements, DL traffic requirements, and/or quality of service requirements. In some aspects, the reallocated subset of resources for the transmissions from the second base station may form an extension carrier of a secondary component carrier (SCC) for use with a legacy carrier.

In some aspects of the method, apparatuses, and/or computer-readable medium described above, the identified subset of resources originally allocated for transmissions in the FDD mode of operation associated with the first base station may include one or more symbols associated with an UL subframe originally allocated for transmissions associated with the first base station. In some aspects, the identified subset of resources originally allocated for the transmissions in the FDD mode of operation associated with the first base station may include one or more symbols associated with one UL subframe. In these cases, the identifying and the reallocating may be performed on a subframe-by-subframe basis, and the reallocating may be based on at least one of UL control requirements, UL traffic requirements, DL control requirements, DL traffic requirements, and quality of service requirements.

In some aspects, the first base station may include a first eNB, such as a macro eNodeB or a Pico eNodeB and the second base station may include a second eNB, such as a pico eNodeB. A guard period may, in some examples, precede the reallocated subset of resources to allow for power ramping and/or UL to DL switching delays at the second base station. Also, a special subframe with a reduced number of symbols may be employed following the resources to prevent overlap with a subsequent UL transmission employing the reallocated subset of resources and/or a guard period following the special subframe may be employed, where the guard period may be based on two times a maximum propagation delay between the second base station and a UE, and/or a UE RX-to-TX switching delay.

Some examples of the method, apparatuses, or computer-readable medium described above may further include processes, features, means, instructions, or code for aligning UL transmissions in the TDD mode of operation associated with the second base station with UL transmissions in the FDD mode of operation associated with the first base station using a timing offset. In these examples, TDD DL transmission associated with the second base station may be delayed by the timing offset compared to FDD DL transmission associated with the first base station.

In some aspects of the method, apparatuses, and/or computer-readable medium, a guard period may be employed preceding the reallocated subset of resources to allow for power ramping and/or UL to DL switching delays. In some aspects, in some aspects, a special subframe with a reduced number of symbols may be employed following the reallocated subset of resources to prevent overlap with a subsequent UL transmissions employing resources and/or a guard period may be employed following the special subframe, where the guard period may be based on two times a maximum propagation delay between the first base station and a UE, and/or a UE RX-to-TX switching delay.

In some aspects, a method for wireless communication by a UE is described, with the method including receiving control signaling regarding reallocation of resources originally allocated for UL transmissions associated with a first base station from the UE in an FDD mode of operation, and receiving DL transmissions from a second base station via the reallocated resources in a TDD mode of operation.

In some aspects, an apparatus for wireless communication is described, with the apparatus including means for receiving control signaling regarding reallocation of resources originally allocated for UL transmissions associated with a first base station from the UE in an FDD mode of operation, and means for receiving DL transmissions from a second base station via the reallocated resources in a TDD mode of operation.

In some aspects, an apparatus for wireless communication is described, with the apparatus including a processor, a memory in electronic communication with the processor, and one or more instructions stored in the memory, the one or more instructions being executable by the processor to receive control signaling regarding reallocation of resources originally allocated for UL transmissions associated with a first base station from the UE in an FDD mode of operation, and receive DL transmissions from a second base station via the reallocated resources in a TDD mode of operation.

In some aspects, a non-transitory computer-readable medium for wireless communication in a wireless device is described, the non-transitory computer-readable medium storing computer-executable code for receiving control signaling regarding reallocation of resources originally allocated for UL transmissions associated with a first base station from the UE in a FDD mode of operation, and receiving DL transmissions from a second base station via the reallocated resources in a TDD mode of operation.

In some aspects of the method, apparatuses, and/or computer-readable medium, the control signaling may include RRC signaling and/or L1 signaling. In some aspects of the method, apparatuses, and/or computer-readable medium, the reallocated resources originally allocated for UL transmissions associated with the first base station from the UE in the FDD mode of operation may include a center portion of a UL bandwidth for FDD UL transmissions to the first base station from the UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
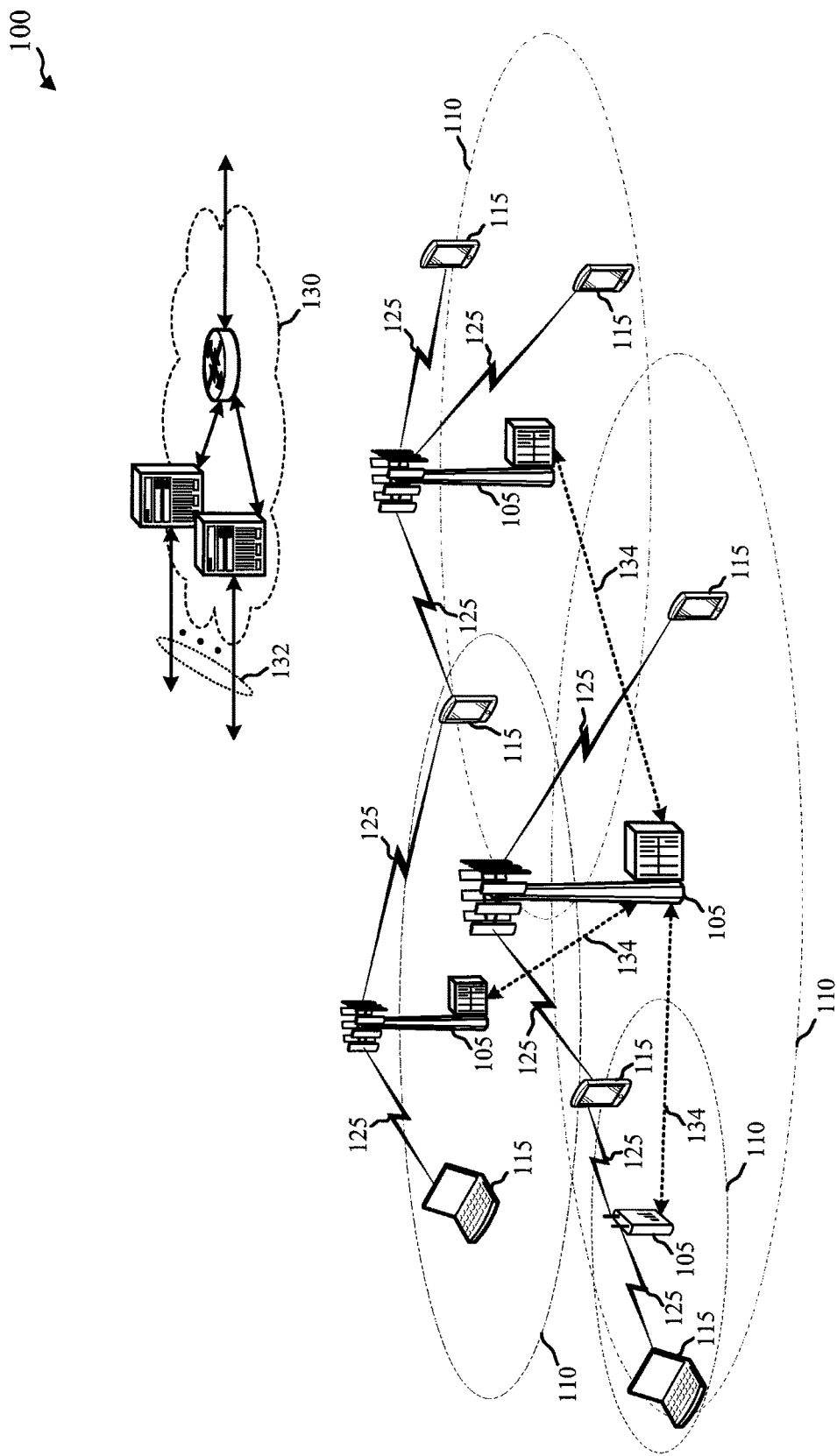
FIG. 1 shows a diagram of a wireless communication system, in accordance with aspects of the present disclosure.

Most frequency division duplex (FDD) wireless communications systems today statically allocate certain frequency bands for different purposes. For example, a first frequency band may be allocated for uplink (UL) transmissions (e.g., on a physical uplink shared channel (PUSCH)), a second frequency band may be allocated for downlink (DL) transmissions (e.g., on a physical downlink shared channel (PDSCH)), with other frequency resources allocated for broadcast information, control signaling, and so forth. The static allocation of these resources is typically based on the expected transmission needs of each particular system, but does not change during operation in response to changing traffic demand. The allocation is typically fixed during operation for several reasons, including possible interference issues, regulatory issues, hardware requirement issues, and so forth. Without dynamically adjusting the resource allocations in view of changing traffic demand, though, valuable resources may be underutilized.

Accordingly, the present disclosure provides features relating to flexible transmissions on one or more FDD resources in order to better utilize the frequency and/or time resources available in a wireless communications system. According to some aspects, a subset of FDD resources associated with a first base station may be identified for reallocation for transmissions in a time division duplex (TDD) mode of operation associated with a second base station, for example, based on dynamically changing UL and/or DL wireless communication needs. If, for example, DL requests are greater than expected but UL requests are fewer than expected in a particular system, resources associated with the first base station that were originally allocated to FDD UL transmissions may be identified for reallocation (e.g., because there is extra FDD UL capacity not being used by the first base station). The spare FDD UL resources may be reallocated, for example, to the second base station for use in a TDD mode of operation (e.g., for DL transmissions to fulfill the higher-than-expected DL demand). In some aspects, in connection with the reallocation of resources, one or more of interference mitigation, flexible resource allocation, and/or physical constraints may be used to reduce the likelihood that the use of the reallocated resources, for example, second base station TDD resources, will interfere with the remaining, first base station FDD resources.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100 in accordance with various aspects of the disclosure. The wireless communication system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro and/or small cell base stations). There may be overlapping geographic coverage areas 110 for different technologies.

In some examples, the wireless communication system 100 is an LTE/LTE-A network. In LTE/LTE-A networks, the term evolved Node B (eNB) may be generally used to describe the base stations 105, while the term UE may be generally used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may use Hybrid Automatic Repeat Request (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communication system 100, and each UE 115 may be stationary or mobile. A UE 115 may include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communication system 100 may include uplink (UL) transmissions from a UE 115 to a base station 105, and/or downlink (DL) transmissions, from a base station 105 to a UE 115. The downlink transmissions may be called forward link transmissions while the uplink transmissions may be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the wireless communication system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Certain resources (e.g., frequency and/or time resources) may be allocated (e.g., assigned) to certain types of UL/DL transmissions in the wireless communication system 100. For example, in an FDD mode of operation, one base station 105 may be allocated a certain set of frequencies to use for UL transmissions and a separate set of frequencies to use for DL transmissions. As described in more detail below, certain resources originally allocated to FDD UL transmissions (e.g., some or all of a physical shared uplink shared channel (PUSCH) resource) may opportunistically be repurposed to support DL traffic (e.g., a heavy DL transmission traffic load). For example, a set of resources may be originally allocated to FDD UL transmissions associated with a first base station 105, and a subset of those resources may be identified for reallocation based on, for example, the subset of resources not being used, a higher priority need for the subset of resources, and so forth. The subset of resources may be identified by the first base station 105, the second base station 105, and/or may be identified by the core network 130, etc. Once the subset of resources is identified, the subset of resources may be reallocated for transmissions in a time division duplex (TDD) mode of operation, for example, associated with a second base station 105. The second base station may be a pico eNodeB operating on a same carrier frequency as the first base station. The second base station may or may not be a neighboring and/or non-collocated with the first base station 105.

The subset of resources may be identified based on, for example, UL control and/or data traffic requirements, DL control and/or data traffic requirements, quality of service (QoS) considerations, combinations of the foregoing, and so forth. In aspects, the reallocated subset of resources may change over time. For example, in some embodiments, the subset of resources may be identified and/or reallocated on a frame-by-frame basis, which may allow flexibility in opportunistically utilizing the resources. For example, the reallocation may be based at least in part on a reconfiguration period. The reconfiguration period may be determined dynamically with a periodicity of 8 ms, 10 ms, 20 ms, 40 ms, and/or 80 ms, as indicated by higher layer signaling, such as L1 signaling. In some cases, a reconfiguration period may be determined semi-statically by RRC signaling. For mixed UL/DL in one subframe, an update of UL/DL ratio may be performed on the subframe basis. In some examples, the identified subset of resources for the transmissions from the second base station may be reallocated on a subframe-by-subframe basis. For example, for mixed UL/DL in one subframe, the update of a UL/DL ratio may be performed on the subframe basis. In other examples, the subset of resources may be identified and/or reallocated less frequently—such as for a defined period of time (e.g., 10 frames, 20 frames, 100 frames, 1,000 frames, 10,000 frames, etc.). In these examples, while the utilization of the available resources may be less flexible than in the frame-by-frame examples, less computation and/or control signaling may be required, which may increase the overall throughput of the system if the changes in, for example, UL and DL traffic requirements do not drastically change over short periods of time.

Figure 2:
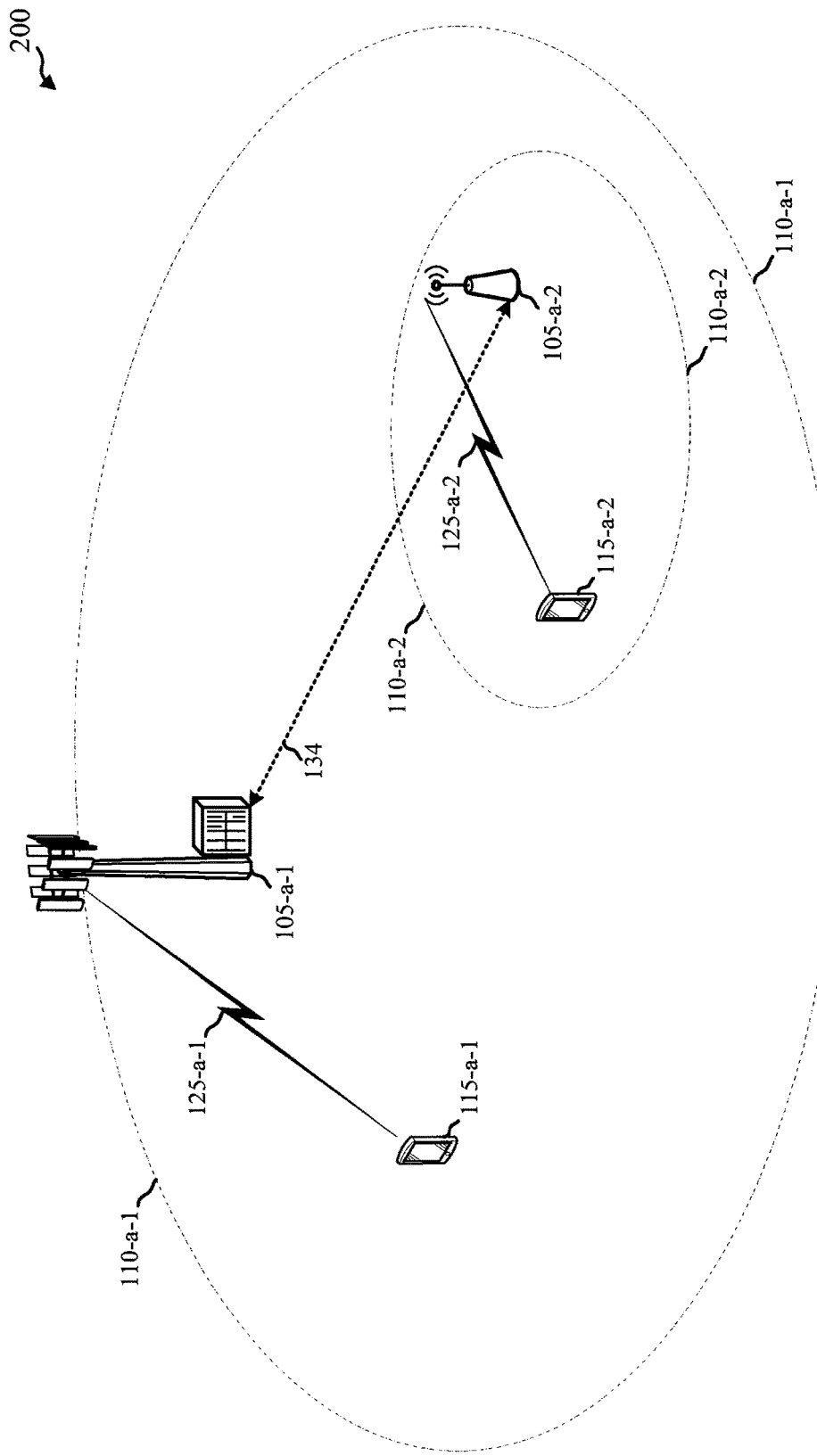
FIG. 2 shows a diagram of another wireless communication system, in accordance with aspects of the present disclosure.

FIG. 2 illustrates another example of a wireless communication system 200, which may be an example of one or more aspects of the wireless communication system 100 in FIG. 1, in accordance with various aspects of the present disclosure. The wireless communication system 200 in FIG. 2 includes a first base station 105-a-1 and a second base station 105-a-2, which may be examples of one or more aspects of the base stations 105 shown in FIG. 1, and includes a first UE 115-a-1 and a second UE 115-a-2, which may be examples of one or more aspects of the UEs 115 shown in FIG. 1. As shown in FIG. 2, the coverage area 110-a-2 of the second base station 105-a-2 may be substantially within the coverage area 110-a-1 of the first base station 105-a-1.

The first UE 115-a-1 may be in wireless communication (e.g., via wireless communication link 125-a-1) with the first base station 105-a-1 in, for example, an FDD mode of operation. As such, the first UE 115-a-1 may transmit UL communications to the first base station 105-a-1 using a set of frequency resources allocated to FDD UL communications, and the first base station 105-a-1 may transmit DL communications to the first UE 115-a-1 using a set of frequency resources allocated to FDD DL communications. The FDD UL and DL frequency resources may be used by the first base station 105-a-1 to provide wireless communications with other UEs (not shown in FIG. 2). As described above, however, some or all of the FDD resources allocated to the first base station 105-a-1 may be underused. For example, the first UE 115-a-1 (and other UEs) may have relatively little data to transmit to the first base station 105-a-1 using the FDD UL frequency resources. Additionally or alternatively, there may be a higher priority need for DL resources—e.g., even if the UL resources are not being underutilized, there may be, for example, an overwhelming DL transmission need, and so forth.

A subset of the resources originally allocated to the first base station 105-a-1 for use in FDD UL transmissions may be reallocated for DL transmissions in a TDD mode of operation associated with the second base station 105-a-2 in FIG. 2. The reallocated resources may be used by the second base station 105-a-2 to transmit DL communications in a TDD format to the second UE 115-a-2 in some examples as shown in FIG. 2, or in other examples, to the first UE 115-a-1. In some embodiments, between 1.4 MHz and 20 MHz may dynamically be reallocated to the TDD format based at least in part on loading (e.g., UL and/or DL traffic demands) at either base station 105-a-1, 105-a-2. The reallocation of resources may dynamically change over time. For example, during certain periods of time, no resources may be reallocated, whereas in other periods of time, different frequencies and/or different time slots may be reallocated to the TDD format.

The second base station 105-a-2 may be neighboring but non-collocated with the first base station 105-a-1, as shown in FIG. 2. For example, and again with reference to FIG. 2, the coverage area 110-a-2 of the second base station 105-a-2 may be encompassed within the coverage area 110-a-1 of the first base station 105-a-1, but the first and second base stations 105-a-1, 105-a-2 may not be located at the same physical location. By reallocating the subset of unused resources to a neighboring but non-collocated base station, base station-to-base station and/or UE-to-UE interference that may otherwise be observed when using the reallocated subset of resources may be reduced. In other embodiments, other types of physical constraints may be imposed on the reallocation of resources, including geographical limitations, transmit power limitations, and so forth. In still other embodiments, no physical constraints may be required, and the FDD UL resources may be reallocated to, for example, a collocated base station or cell. In some examples, the first base station 105-a-1 in FIG. 2 may be a macro eNodeB, while the second base station 105-a-2 in FIG. 2 may be a pico eNodeB.

In another example, wireless communication system 200 may include a primary cell (PCell) and/or a secondary cell (SCell) for use in carrier aggregation associated with the first base station 105a-1. Spare UL resources of the SCell may be reallocated for DL transmissions on the second base station 105-a-2. Because HARQ acknowledgment (HARQ-ACK) feedback for the DL carrier aggregation of the first base station is transmitted on the PCell, this reallocation for DL resources may have little to no impact on HARQ-ACK feedback for the DL transmissions of the first base station.

Referring still to FIG. 2, the identification and reallocation of resources originally allocated for FDD UL transmissions associated with the first base station 105-a-1 may be done by the first base station 105-a-1, the second base station 105-a-2, the core network (not shown in FIG. 2), and/or another entity. Once the resources have been identified and a decision has been made to reallocate the resources for, for example, TDD DL transmissions associated with the second base station 105-a-2, control signaling (e.g., semi-static or dynamic control signaling) may be provided to one or more of the various entities of the wireless communication system 200. As one example, the second base station 105-a-2 may transmit control signaling to the second UE 115-a-2 that is to receive data via the reallocated subset of resources using UE-specific RRC signaling and/or L1 signaling. In one embodiment, a 3-bit indicator may be used to select from one of several different values (e.g., n6, n15, n25, n50, n75, n100) corresponding to different amounts of reallocated resources (e.g., 1.4 MHz to 20 MHz). Also, a separate value (e.g., n0) may be used to indicate that no FDD UL resources should be reallocated (e.g., to disable the reallocation of resources).

In addition to providing control signaling to the second UE 115-a-2, control signaling may be provided to the first UE 115-a-1 so that the first UE 115-a-1 does not attempt to transmit UL communications to the first base station 105-a-1. Additionally or alternatively, if the first base station 105-1-a (e.g., or the core network) identifies the resources for reallocation, the first base station 105-a-1 (e.g., or the core network) may provide control signaling to the second base station 105-a-2 informing the second base station of the additional resources the second base station 105-a-2 may use in communicating with the second UE 105-a-2. Based at least in part on the received control signaling, the second base station 105-a-2 may map at least one of the cell-specific reference signal (CRS), the channel state information reference signal (CSI-RS), the physical downlink control channel (PDCCH), and/or the physical downlink shared channel (PDSCH) associated with the second base station 105-a-2 to the reallocated subset of resources.

The subset of resources reallocated for the TDD transmissions associated with the second base station may in some embodiments form an extension carrier of a secondary component carrier (SCC) for use together with a separate, legacy carrier (e.g., a Rel-10 carrier). In one embodiment, the first base station is configured as the primary component carrier (PCC) for DL transmission and the second base station is configured as the SCC with TDD DL format. A UE 115 supporting flexible duplex may camp on the first base station (e.g., configured for a PCell). After an RRC connection is set up between the base station 105 and the UE 115, the UE may be configured with a TDD SCell on an FDD UL frequency band to provide additional radio resources for DL transmissions. The TDD bandwidth in the UL frequency band may or may not be the same as the FDD UL bandwidth, and/or may be adapted in a time domain. The TDD SCell may be activated or deactivated using MAC signaling, for example. If the TDD SCell is deactivated, the UE may assume regular UL transmission in the UL frequency band for the first base station.

While the above description has broadly outlined the configuration illustrated in FIG. 2 with two separate base stations 105-a-1, 105-a-2 and two separate UEs 115-a-1, 115-a-2, other configurations may be used. In one alternate embodiment, FDD UL resources from the first base station 105-a-1 may be reallocated for the TDD DL transmissions from the second base station 105-a-2, but only a single UE 115-a-1 may be involved. For example, if the single UE 115-a-1 requires a relatively large amount of DL transmissions but few UL transmissions, the FDD UL resources associated with the first base station 105-a-1 may be reallocated to the second base station 105-a-2 for use in providing additional DL transmissions to the single UE 115-a-1. As still another example of an alternate embodiment, only a single base station 105-a-1 may be used, with FDD UL resources being reallocated for TDD DL transmissions from the single base station 105-a-1 to one or more UEs 115-a-1, 115-a-2.

Figure 3A:
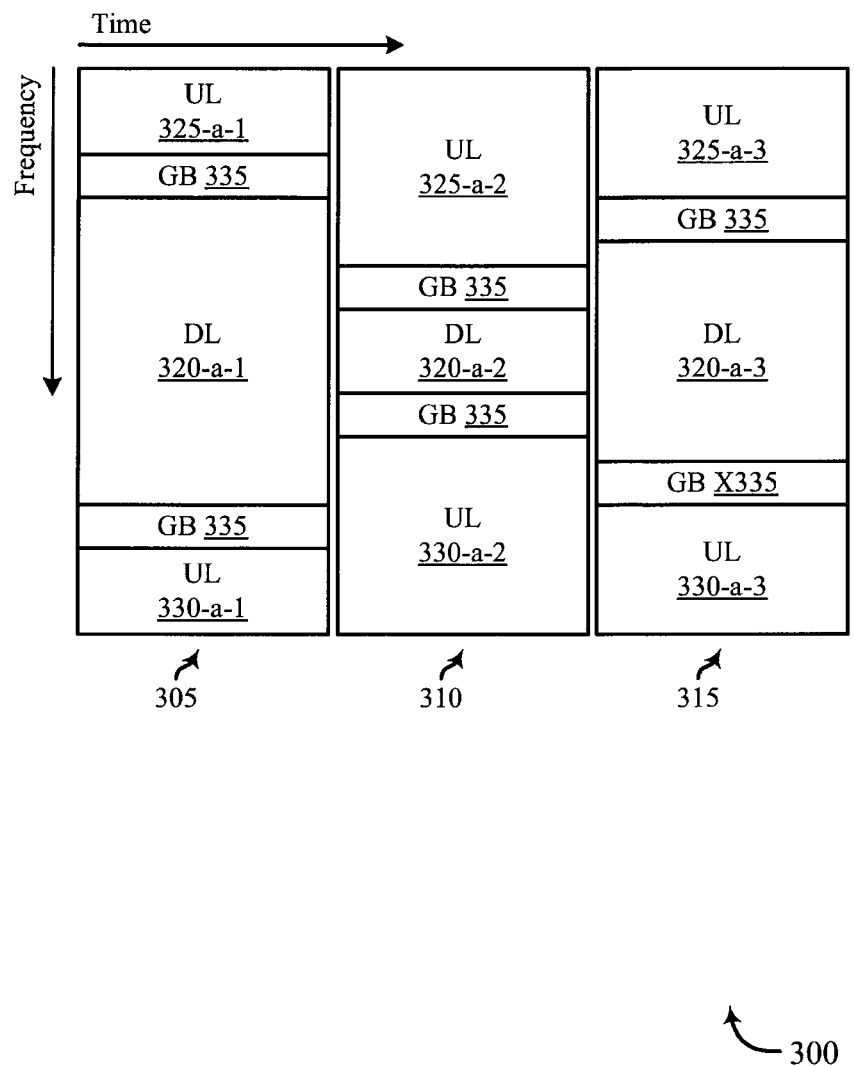
FIG. 3A shows a block diagram of resource allocation, in accordance with aspects of the present disclosure.
Figure 4A:
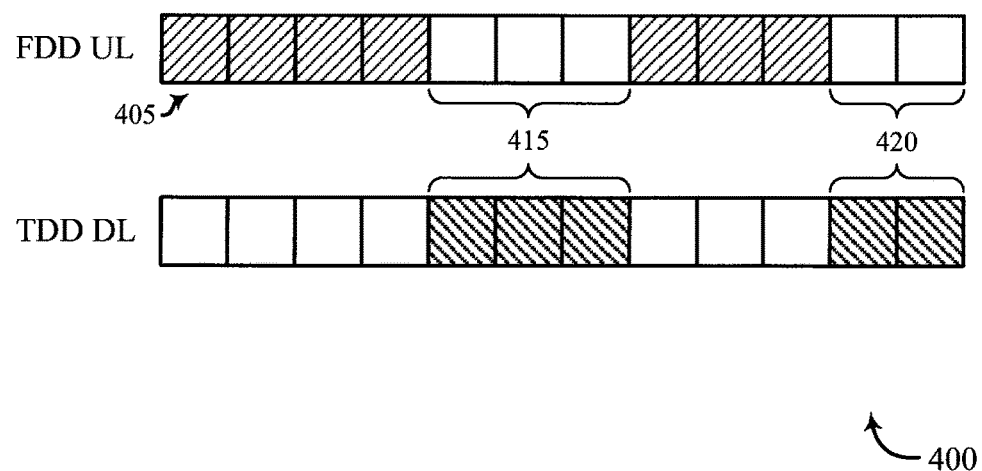
FIG. 4A shows a block diagram of resource allocation, in accordance with aspects of the present disclosure.

FIGS. 3A and 4A show block diagrams 300, 400 of two examples of resource allocation for use in the wireless communication system 100 and/or 200 of FIGS. 1 and/or 2, in accordance with various aspects of the present disclosure. Turning first to FIG. 3A, one example of resource reallocation using flexible frequency resource allocation is shown, with the frequency resources allocated to DL and UL transmissions varying over time. For each of three different periods of time 305, 310, 315 (e.g., which may be a frame or generally any period of time), a set of frequency resources originally allocated for transmissions in an FDD mode of operation is shown. As described above, the set of resources may be originally allocated for FDD UL transmissions associated with the first base station 105-a-1 in FIG. 2. As illustrated in FIG. 3A, however, a subset of reallocated resources 320-a-1 of the frequency resources is reallocated for DL transmissions in a TDD mode of operation during the first period of time 305. The reallocated TDD DL resources may be used by, for example, a second base station 105-a-2 in FIG. 2 which may, in some examples, be a pico eNodeB operating on a same carrier frequency as the first base station.

The entire set of FDD UL resources may, however, not be reallocated for the TDD DL transmissions. Instead, remaining FDD UL resources 325-a-1, 330-a-1 may be separated from the subset of reallocated resources 320-a-1 by one or more respective guard bands (GBs) 335. Using guard bands 335 to separate the reallocated resources 320-a-1 from the remaining resources 325-a-1, 330-a-1 may reduce interference to the remaining resources 325-a-1, 330-a-1 from DL transmissions employing the reallocated resources 320-a-1, and vice versa. Additionally or alternatively, interference with the remaining FDD UL resources 325-a-1, 330-a-1 by the reallocated TDD DL resource may be reduced by reducing the transmit power used by the second base station to transmit data using the reallocated TDD DL resources and/or by increasing the transmission power used by UEs 115 while employing the remaining FDD UL resources. In one example, the TDD DL transmit power may be reduced such that the power observed from the TDD DL transmissions of the second base station 105-a-2 at the first base station 105-a-1 is not significantly more than the power that would be observed from those UEs that are using the remaining subset of resources for UL transmissions to the first base station 105-a-1. In this manner, the interference that may otherwise result from reallocating the subset of resources 320-a-1 for TDD DL transmissions may further be reduced.

The bandwidth of the reallocated subset of resources 320-a-1 may change over time. For example, during a second period of time 310, the bandwidth of the reallocated subset of resources 320-a-2 may be smaller than during the first period of time 305, but during a third period of time 315 the bandwidth of the subset of resources 320-a-3 may again increase (e.g., with the bandwidths of the remaining resources 325-a-2, 330-a-2, 325-a-3, 330-a-3 increasing during the second period of time 310 and again decreasing during the third period of time 315). As explained above, the amount of resources that are available and/or needed for reallocation may vary over time based on, for example, UL/DL traffic requirements, QoS considerations, and so forth.

In some embodiments, and as illustrated in FIG. 3A, the reallocated subset of resources 320-a-1 may be a middle or center portion of the FDD UL frequency band. In this manner, the band edge resource blocks (RBs) may remain as FDD UL resources so that physical uplink control channel (PUCCH) transmissions in the first base station 105-a-1 are unaffected by the reallocation of the middle portion of resources for TDD DL transmissions associated with another base station. In some embodiments, a parity of a number of RBs in the reallocated subset of resources may be equal to a parity of a number of RBs originally allocated for the FDD UL transmissions. For example, if the total number of RBs originally allocated to FDD UL transmissions during the first period of time 305 is even, then the number of RBs reallocated for TDD DL transmissions may also be even.

Still referring to FIG. 3A, in some examples where a TDD cell (e.g., or a TDD base station) is configured to use resources on an FDD UL frequency band utilizing UL spectrum for DL transmission, the TDD base station may operate in a center bandwidth in subframes (e.g., the middle portion of the FDD UL frequency band, e.g., 320-a) where there is no PUSCH/SRS/PRACH transmissions on FDD at neighboring cells. In these examples, PUCCH transmissions on FDD at neighboring cells may be uninterrupted because the corresponding resources at edges (e.g., band edge RBs) would not be used by the TDD base station in any subframe. In some embodiments, center bandwidths for a TDD base station may be dynamically configured using RRC signaling and/or L1 signaling.

Figure 3B:
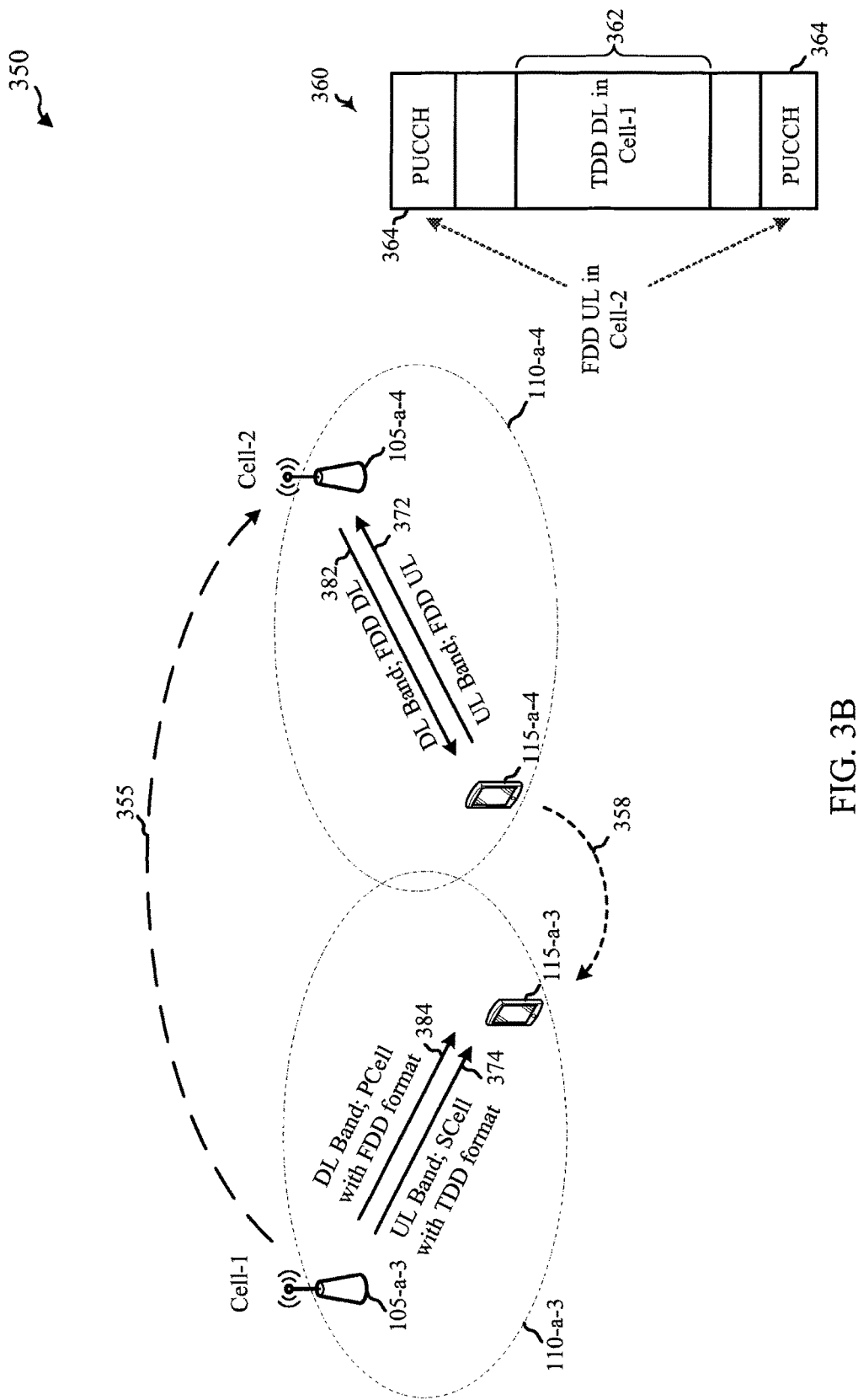
FIG. 3B shows a diagram of a wireless communication system in accordance with various aspects of the present disclosure.

FIG. 3B illustrates another example of a wireless communication system 350, which may be an example of one or more aspects of the wireless communication system 100 and/or 200 in FIGS. 1 and/or 2, in accordance with various aspects of the present disclosure. The wireless communication system 350 in FIG. 3B includes a first base station 105-a-3 and a second base station 105-a-4, which may be examples of one or more aspects of the base stations 105 shown in FIGS. 1 and/or 2, and includes a first UE 115-a-3 and a second UE 115-a-4, which may be examples of one or more aspects of the UEs 115 shown in FIGS. 1 and/or 3. As shown in FIG. 3B, the coverage area 110-a-3 of the first base station 105-a-3 may overlap with the coverage area 110-a-4 of the second base station 105-a-4.

In some examples, each of the first base station 105-a-3 and the second base station 105-a-4 may be associated with small cells (e.g., pico cells). For example, the first base station 105-a-3 may be associated with a first pico cell (e.g., cell-1) and the second base station 105-a-4 may be associated with a second pico cell (e.g., cell-2). As shown in FIG. 3B, in some examples, the second UE 115-a-4 may be in wireless communication with the second base station 105-a-4 in an FDD mode of operation. As such, the second UE 115-a-4 may transmit UL communications 372 to the second base station 105-a-4 using a set of frequency resources allocated to FDD UL communications, and the second base station 105-a-4 may transmit DL communications 382 to the second UE 115-a-4 using a set of frequency resources allocated to FDD DL communications. As shown, in some examples where the first UE 115-a-3 is configured with a primary cell (PCell) with FDD DL format 384 and may also be configured with a secondary cell (SCell) with TDD DL format 374 (e.g., but configured to use reallocated UL FDD frequency bands for DL transmissions), DL transmissions from the first base station 105-a-3 may interfere with UL transmissions between the second UE 115-a-4 and the second base station 105-a-4. For example, when the SCell with TDD DL format is activated, the first base station may use the same frequency as the second base station 105-a-4 by using the reallocated UL frequency band. To avoid a base station-base station interference 355 on the UL frequency band and/or UE-UE interference 358 on the UL frequency band, for example, only a portion 362 of a UL bandwidth 360 may be used for TDD DL transmission. In this manner, the TDD DL transmission on the UL frequency band by the first base station 105-a-3 (e.g., cell-1) will not interrupt a PUCCH transmission 364 on an FDD UL frequency band between the second base station 105-a-4 (cell-2) and the second UE 115-a-4, which may use band-edge RBs described above with reference to FIG. 3A. In some aspects, the second base station 105-a-4 comprises an eNodeB operating on the same carrier frequency as the first base station or an eNodeB operating on an adjacent carrier frequency as the first base station.

Turning now to FIG. 4A, an example of resource reallocation using time division multiplexing (TDM) is shown, with the reallocation of the FDD UL resources varying over time. In FIG. 4A, the resources originally allocated for transmissions in the FDD mode of operation include a number of FDD UL subframes 405, one or more subsets 415, 420 of which are reallocated for TDD DL transmissions. In one embodiment, the one or more subsets 415, 420 may correspond to reserved subframes, for example, almost blank subframes (ABS) of the FDD UL subframes 405 associated with a first base station, such as the first base station 105-a-1 in FIG. 2.

The subframes for a TDD DL transmission may be configured by either RRC and/or L1 signaling. For RRC signaling, a set of periodic UL subframes (e.g., ABS UL subframes) may be configured for DL resources of a TDD cell. For L1 signaling, for example, a periodicity may be configured by higher layer signaling for a reconfiguration period, similar to the technique used in enhanced interference management and traffic adaptation (eIMTA). The L1 signaling may indicate a set of dynamic DL subframes per reconfiguration period.

Figure 4B:
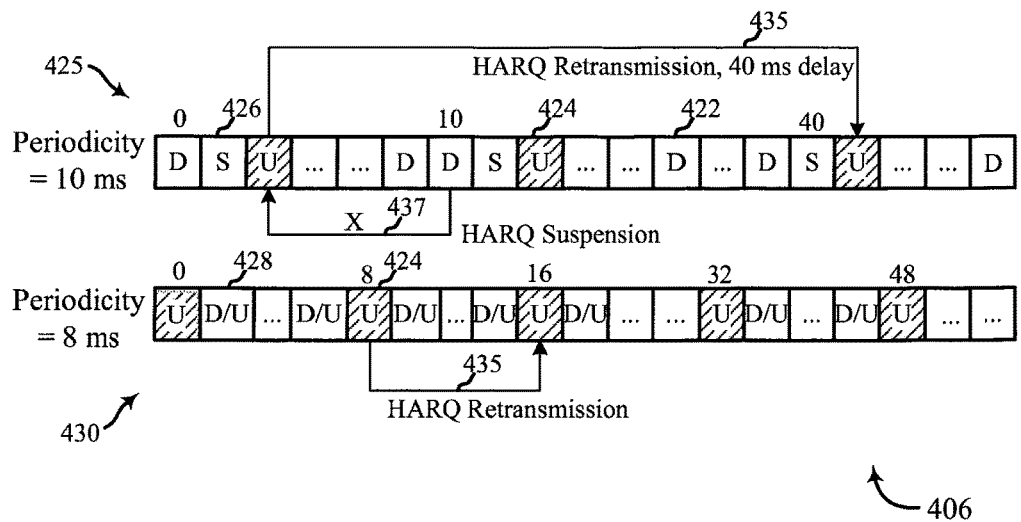
FIG. 4B shows examples of HARQ transmissions having different reconfiguration periods in accordance with aspects of the present disclosure.
Figure 4C:
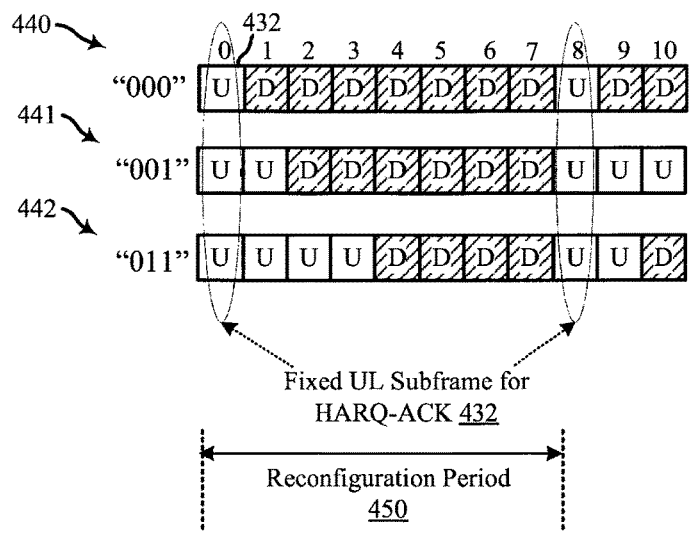
FIG. 4C illustrates a dynamic change of UL-DL configurations by L1 signaling during reconfiguration in accordance with aspects of the present disclosure.

FIGS. 4B and 4C illustrate examples of the UL-DL subframe reallocation (e.g., reconfiguration) in accordance with aspects of the present disclosure. FIG. 4B shows examples 425, 430 of HARQ transmissions having different reconfiguration periods. The first example 425 shows a case where a multiple of 10 ms reconfiguration period is used similar to that used in TDD eIMTA. The first example 425 having a 10 ms periodicity includes a number of downlink (D) subframes 422, a number of uplink (U) subframes 424, and special (S) subframes 426 per radio frame. The second example 430 having a 8 ms periodicity includes a number of uplink (U) 424 subframes and a number of downlink/uplink (D/U) subframes 428. In the first example 425, a 40 ms delay may occur until a next uplink subframe (U) transmission due to a conflict with a HARQ transmission 435 (e.g., causing a HARQ suspension 437) during the reconfiguration period. However, the reconfiguration period may be configurable. In this manner, a reconfiguration period may be selected that will not conflict with a HARQ transmission, as shown in the example 430. For example, unlike TDD eIMTA, the reconfiguration period may be 8 ms, (e.g., or 2 ms or 4 ms with a multiple of 2 ms) in addition to 10, 20, 40, or 80 ms. When the 8 ms reconfiguration period is used, a UL retransmission of a legacy UE may be uninterrupted during the reconfiguration.

As described above, the subframes for a TDD DL transmission may be configured by either RRC or L1 signaling. FIG. 4C illustrates a dynamic change of UL-DL configurations via L1 signaling during reconfiguration in accordance with aspects of the present disclosure. The interpretation of L1 signaling is dependent on a configured reconfiguration period. For example, when a reconfiguration period is 10, 20, 40 or 80 ms, 3-bit signaling corresponding to 7 TDD UL-DL configurations may be used to indicate a set of uplink (U) subframes for downlink (D) transmissions, similar to that used in TDD eIMTA. For an 8 ms reconfiguration period, 3-bit signaling 440, 441, or 442 may be used to indicate the set of uplink (U) subframes in the reconfiguration period 450. The below table provides a mapping of values and subframe offsets that can be used for the 3-bit L1 signaling for 8 ms reconfiguration period. The fixed UL subframe 432 may be defined as the common UL subframes of all the possible configurations and may be used to transmit UL HARQ-ACK feedback.

| Values | Subframe offsets | Values | Subframe offsets |
|--------|------------------|--------|------------------|
| 000 | 0 | 100 | 0, 1, 2, 3, 4 |
| 001 | 0, 1 | 101 | 0, 1, 2, 3, 4, 5 |
| 010 | 0, 1, 2 | 110 | 0, 1, 2, 3, 4, 5, 6 |
| 011 | 0, 1, 2, 3 | 111 | 0, 1, 2, 3, 4, 5, 6, 7 |

In carrier aggregation where a PCell FDD DL is configured for a primary component carrier (PCC), the TDD cell may be configured as an SCell to provide additional radio resources for DL transmission. For example, if FDD DL traffic is bursty, the TDD cell may configure additional resources for use in DL transmission. In some embodiments, the TDD SCell may be activated or deactivated by MAC signaling. If the TDD SCell is activated, the UE may monitor L1 signaling for locations of DL subframes from the SCell reallocated from the PCell FDD UL frequency band per radio frame.

Referring now to both FIGS. 3 and 4, in some embodiments, frequency division multiplexing (FDM) and time division multiplexing (TDM) resource reallocation techniques may be combined. For example, in some FDD UL subframes, no resources may be available for reallocation, whereas in other subframes, some or all of the FDD UL resources may be available. In this example, TDM resource allocation may be used to separate those frames with available resources for allocation to TDD DL transmissions from those without available resources for allocation. Even in those frames in which resources are available for reallocation, however, the entire FDD UL band may not be available for reallocation for TDD DL transmissions. In these frames, FDM resource allocation may be used to separate remaining FDD UL resources from the reallocated TDD DL transmissions.

Figure 4D:
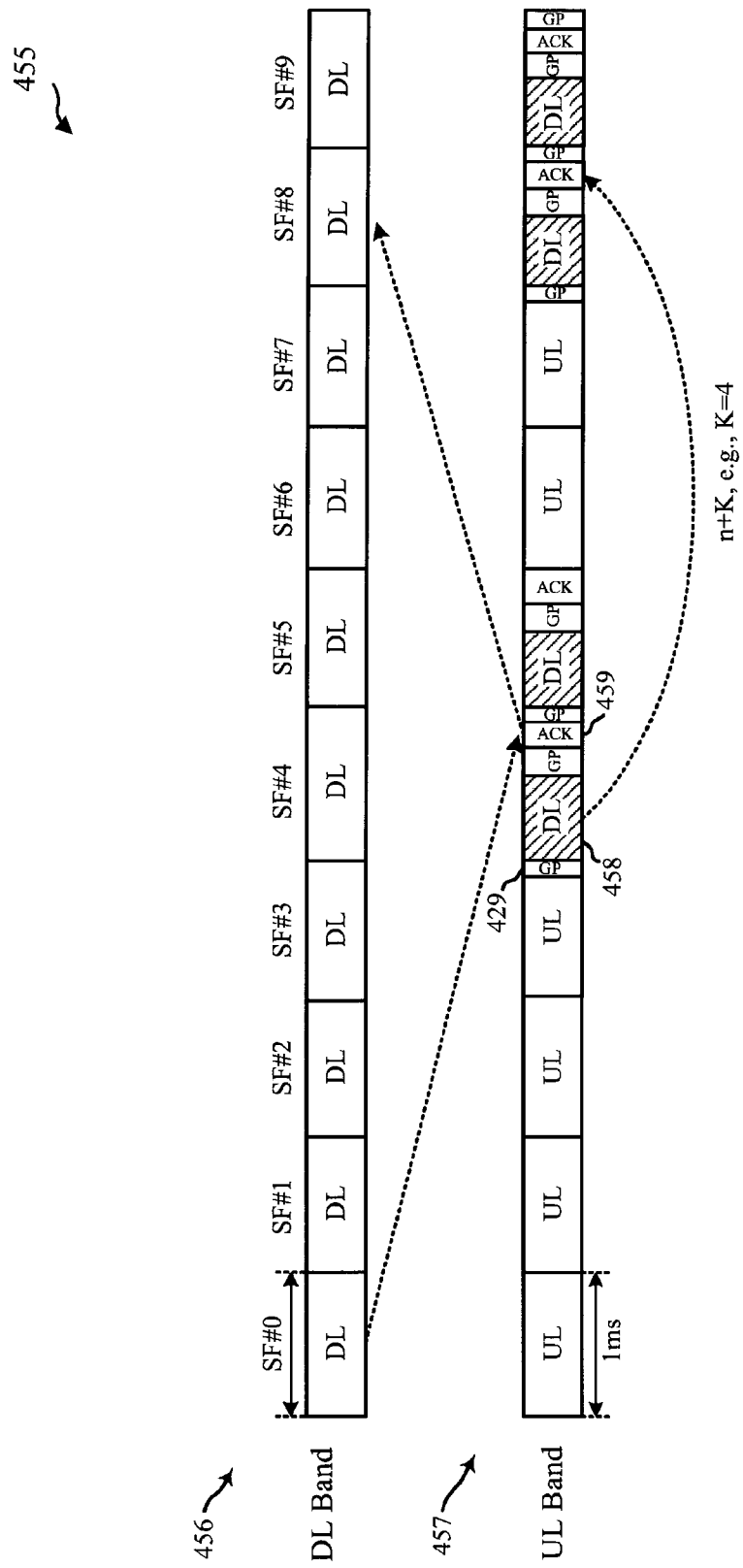
FIG. 4D shows an example of a dynamic UL-DL configuration for TDM which may allow both UL and DL resources to be mixed in one subframe in accordance with aspects of the present disclosure.

FIG. 4D shows an example 455 of a dynamic UL-DL configuration for TDM which may allow both UL and DL resources to be mixed in one subframe in accordance with aspects of the present disclosure. For an UL frequency band 457, at least part of an UL subframes may be dynamically used for DL data transmission 458 and part of the UL subframe may be used for HARQ-ACK transmission 459 on the UL frequency band 457. In this manner, there may be no change on DL/UL HARQ timing. For example, UL HARQ-ACK corresponding to DL transmission in subframe n may be transmitted in subframe n+K, where K may be 4 ms, for example. A guard period (GP) 429 may be configured between UL and DL transmissions and/or between DL transmission and the HARQ-ACK transmission 459.

Figure 4E:
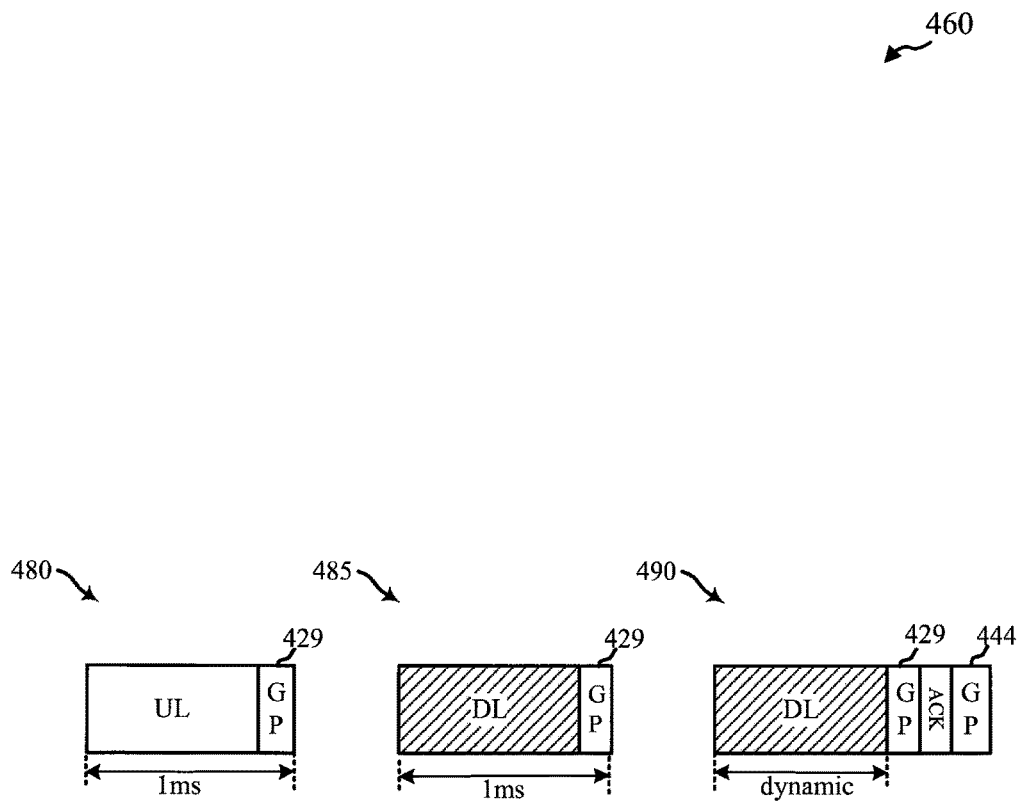
FIG. 4E shows examples of three different types of subframes that may be used for the mixed UL/DL mode of operation in accordance with aspects of the present disclosure.

FIG. 4E shows examples 460 of three different types of subframes 480, 485, 490 that may be used for mixed UL/DL mode of operation in accordance with aspects of the present disclosure. As illustrated in FIG. 4E, there may be, for example, three type of subframes on a UL frequency band for a mixed UL/DL configuration. Type 1 480 may be referred to as a full UL subframe. Type 1 480 may be used for UL only transmission. Type 2 485 may be referred to as a full DL subframe. Type 2 485 may be used for DL only transmission. Type 3 490 may be referred to as a mixed UL and DL subframe. In Type 3, part of the subframe may be used for DL transmission and part of the subframe may be used for an UL transmission such as HARQ-ACK feedback transmission. A guard period (GP) 444 may be configured between DL and UL transmissions for Type 3 subframe.

In all three types of subframes 480, 485, 490, an additional guard period (GP) 429 may be added at the end of the subframe if a following subframe has a different transmission direction. For subframe Type 3 490, the duration for DL transmission may be dynamically configured from one symbol to twelve symbols (e.g., reserving at least one symbol for GP and one symbol for UL HARQ-ACK).

In some embodiments, additional L1 signaling may be used to indicate the subframe type and/or the presence of an additional GP 429 at the end of the subframe. For example, L1 signaling in subframe n-1 may be used to indicate the subframe type for subframe n and/or whether there is an additional GP 429 in subframe n. If subframe n is a Type 2 or Type 3 subframe, then a UE may need to monitor for both DL and UL frequency bands for DL PDSCH and/or PDCCH transmissions.

Figure 5:
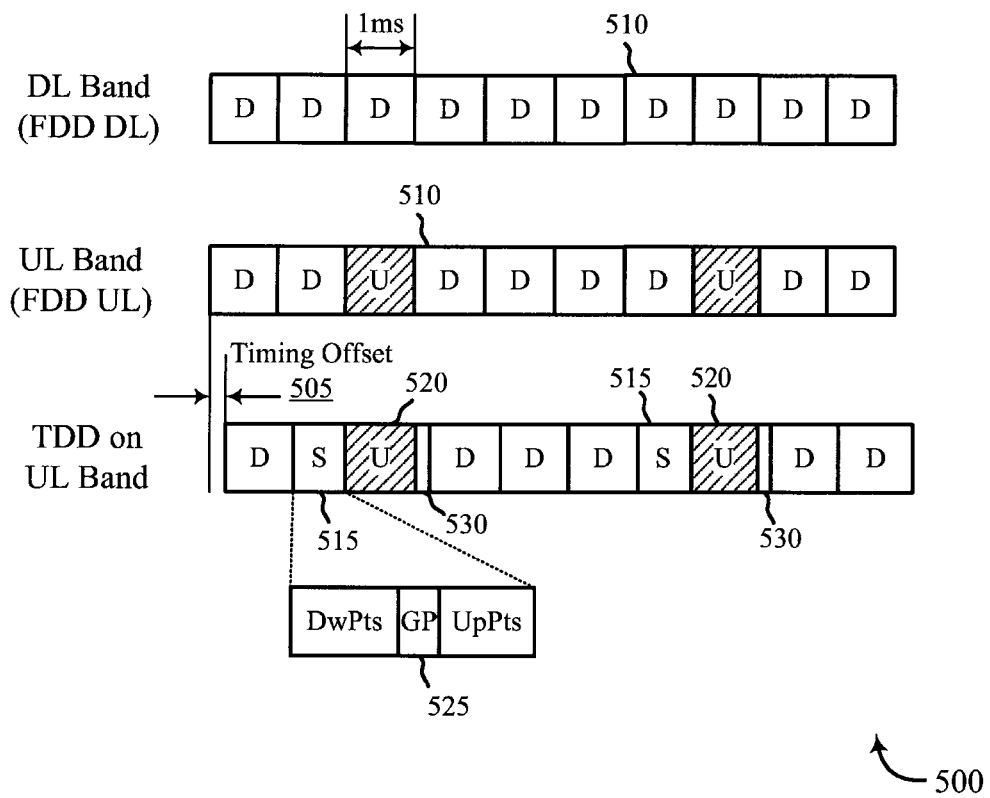
FIG. 5 shows a block diagram illustrating TDD and FDD DL synchronization using a timing offset, in accordance with aspects of the present disclosure.

FIG. 5 shows a block diagram 500 illustrating TDD and FDD DL synchronization in accordance with aspects of the present disclosure. As shown in FIG. 5, TDD DL transmission on UL band may be delayed by a fixed timing offset 505 compared to FDD DL transmission on DL band. The delay may be used to align a TDD UL transmission and a FDD UL transmission. In this example, a special subframe 515 with a reduced number of symbols may be employed preceding the unallocated UL subframes in order to, for example, help prevent interference from the TDD DL transmission employing the reallocated subset of resources for the following FDD UL transmission. A guard period (GP) 520 may be employed in the special subframe 515, and the length of the GP 525 may be based on two times of a maximum propagation delay between the second base station 105-*a*-2 and the second UE 115-*a*-2 in FIG. 2, and/or based on the UE's receive-to-transmit switching delay. In some embodiments, a second guard period 530 may further be employed following the UL subframe 520, and the length of the second guard period 530 may be based on the eNB's receive-to-transmit switching delay. In this manner, the TDD UL transmission is aligned with the FDD UL transmission and TDD DL transmission is delayed by one specific timing offset 505 compared to FDD DL transmission on FDD DL band.

Figure 6:
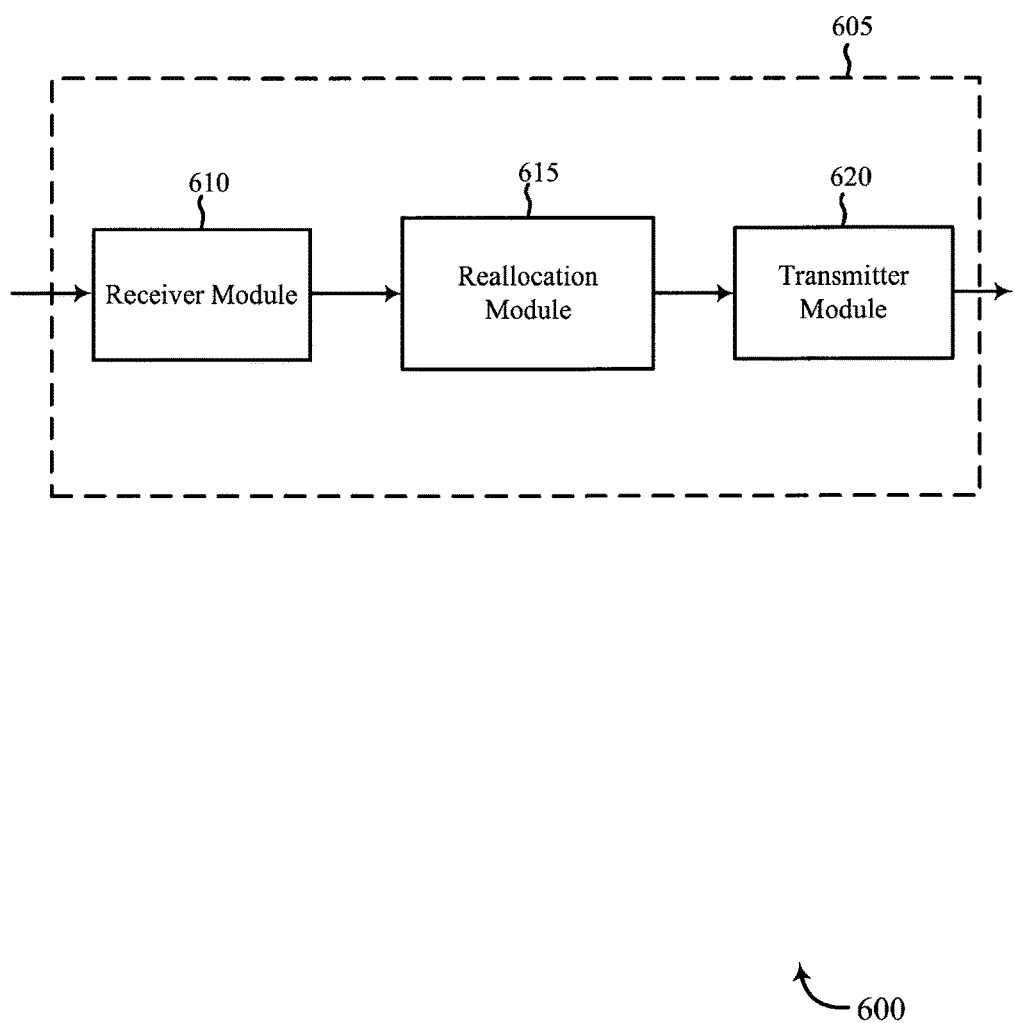
FIG. 6 shows a block diagram of a device configured for use in wireless communication, in accordance with aspects of the present disclosure.

FIG. 6 shows a block diagram 600 of a device 605 for use in wireless communication in the wireless communication systems 100, 200 shown in FIGS. 1 and 2, in accordance with various aspects of the present disclosure. The device 605 may be an example of one or more aspects of a base station 105 described above with reference to FIG. 1 or 2, and/or an example of one or more aspects of the core network 130 described above with reference to FIG. 1. The device 605 may include a receiver module 610, a reallocation module 615, and/or a transmitter module 620. The device 605 may be or include a processor (not shown). Each of these modules may be in communication with each other.

The components of the device 605 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 610 may receive information such as packets, user data, and/or control information associated with various information channels (e.g., control channels, data channels, etc.). For example, if the device 605 is a base station 105, the receiver module 610 may be configured to receive data from the core network 130 that is to be wirelessly transmitted to a UE 115. The receiver module 610 may receive UL and or DL traffic and/or QoS information related to one or more UEs and/or base stations. If, for example, the device 605 is a base station 105, the receiver module 610 may receive traffic/QoS information for neighboring base stations 105 and traffic/QoS information for UEs 115 served by itself and/or the neighboring base stations. Information received by the receiver module 610 may be passed on to the reallocation module 615 and/or to the transmitter module 620.

The reallocation module 615 may be configured to identify for reallocation a subset of resources originally allocated for transmissions in an FDD mode of operation associated with a first base station (e.g., which may be the device 605). The reallocation module 615 may be configured to reallocate the identified subset of resources for transmissions in a TDD mode of operation associated with the first base station and/or a second base station, which may or may not be neighboring and/or non-collocated with the first base station. As explained above, the identified subset of resources may correspond to one or more uplink channel resources, such as physical uplink shared channel (PUSCH) resources associated with the first base station, and the identified subset of resources may be reallocated for use in TDD DL transmissions from the first and/or second base stations.

The transmitter module 620 may transmit one or more signals received from other components of the device 605. For example, the transmitter module 620 may transmit user data to UEs 115 if the device 605 is a base station 105. The transmitter module 620 may further transmit control signaling to UEs 115, base stations 105 and/or the core network 130, etc. in order to inform one or more of these various entities of a reallocation of resources. In aspects, the transmitter module 620 may be configured to transmit data using one or more reallocated resources, as described above. In some examples, the transmitter module 620 may be collocated with the receiver module 610 in a transceiver module.

Figure 7:
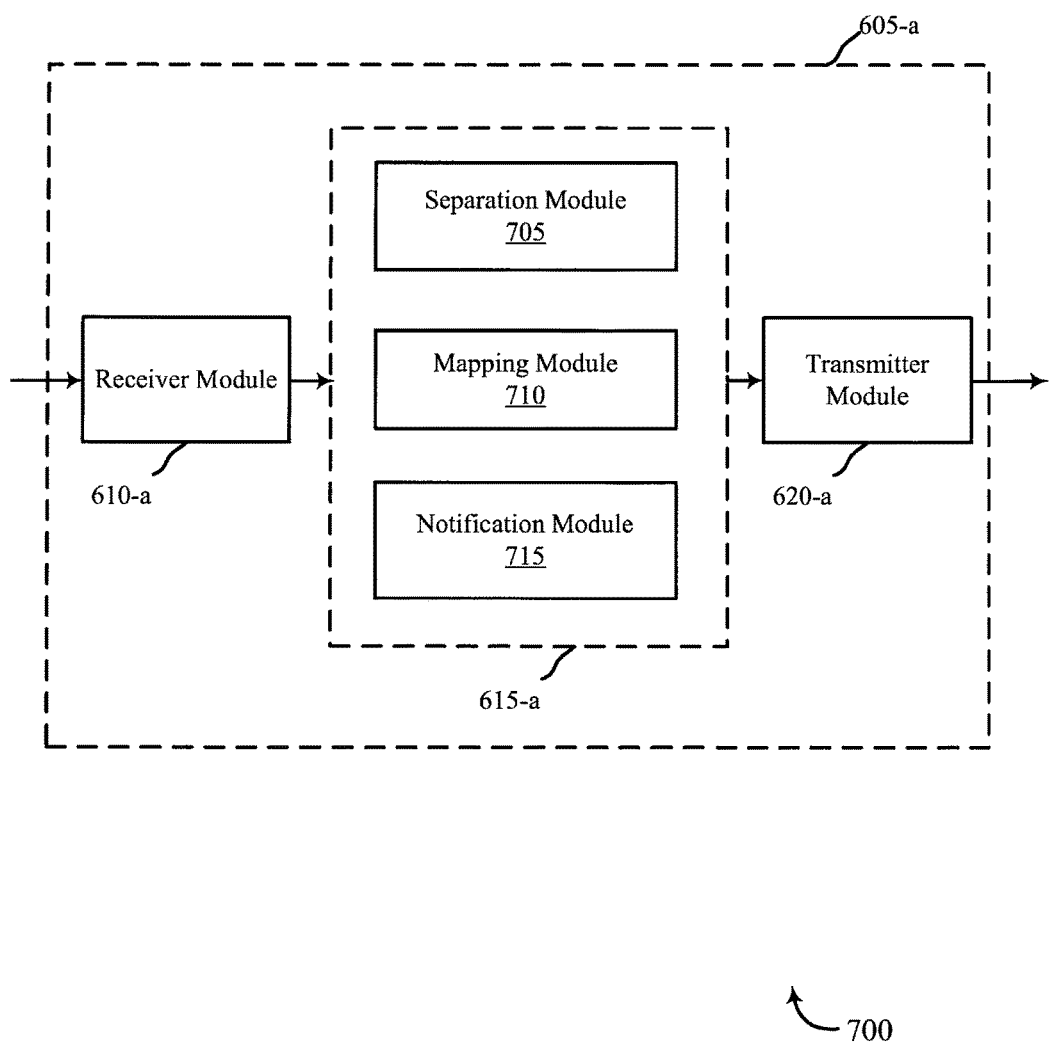
FIG. 7 shows a block diagram of another device configured for use in wireless communication, in accordance with aspects of the present disclosure.

FIG. 7 shows a block diagram 700 of a device 605-*a* for use in wireless communication in the wireless communication system 100, 200, and/or 350 shown in FIGS. 1, 2, and/or 3B, in accordance with various examples. The device 605-*a* may be an example of one or more aspects of the device 605 described with reference to FIG. 6. The device 605-*a* may include a receiver module 610-*a*, a reallocation module 615-*a*, and/or a transmitter module 620-*a*, which may be examples of the corresponding modules of device 605. The device 605-*a* may also include a processor (not shown). Each of these components may be in communication with each other. The reallocation module 615-*a* in FIG. 7 may include a separation module 705, a mapping module 710, and a notification module 715. The receiver module 610-*a* and the transmitter module 620-*a* may perform the functions of the receiver module 610 and the transmitter module 620, of FIG. 6, respectively.

The separation module 705 may be configured to identify and/or reallocate a subset of resources, as described above, in a manner to reduce possible interference that would otherwise be caused or is caused by utilizing the reallocated subset of resources. The separation module 705 may also be configured to identify and/or reallocate the subset of resources in a manner to reduce the impact of the reallocated resources on control and other signaling used for UL and DL transmissions other than on the reallocated subset of resources. The separation module 705 may thus utilize flexible resource allocation in separating the reallocated subset of resources from other, non-reallocated resources in one or more of time (e.g., using TDM and/or guard periods), frequency (e.g., using FDM and/or guard bands), and/or spatial location (e.g., using physical location constraints).

The mapping module 710 may be configured to map resources to UL and/or DL physical channels. In the course of reallocating one or more subsets of resources as described herein, it will be appreciated that reference symbol (RS) mapping and control signaling may need to be adapted to account for the reallocated resources. As one example, physical downlink control channel (PDCCH) and DL common control of system information block (SIB), random access response (RAR), and/or paging may be mapped according to the resource allocation defined in a master information block (MIB), instead of the dynamically reallocated resource configuration. Cell-specific reference signals (CRS) may be mapped based on the reallocated resources. UE-specific reference signals (UE-RS) may continue to be mapped based on assigned resource blocks, and channel state information reference signals (CSI-RS) may be mapped based on the dynamically changing reallocation of resources in order to allow UEs 115 to feedback channel state information regarding all of the available resources.

In those embodiments in which TDD UL transmissions are allowed in the FDD UL band, the mapping module 710 may determine which resource allocation is applied to each physical channel. For example, the physical random access channel (PRACH) and the physical uplink control channel (PUCCH) may be mapped based on resource allocation information in the MIB in consideration of legacy UE support or the possibility of UEs being in idle mode. For sounding reference signals (SRS), the mapping may depend on the SRS type—for example, the resource allocation information in the MIB may be used for type 0 SRS and the reallocated resource information may be used for type 1 SRS. The physical uplink shared channel (PUSCH) may be mapped based on the dynamically changing resource reallocation information.

Still referring to the mapping module 710, in some embodiments, the reallocated subset of resources may be mapped to form an extension carrier of a secondary component carrier (SCC) for use with a legacy carrier.

The notification module 715 in FIG. 7 may be configured to provide control signaling to the transmitter module 620-*a* for transmission to UEs 115, base stations 105, and/or the like regarding the reallocated subset of resources identified by the separation module 705 and the mapping determined by the mapping module 710.

Figure 8:
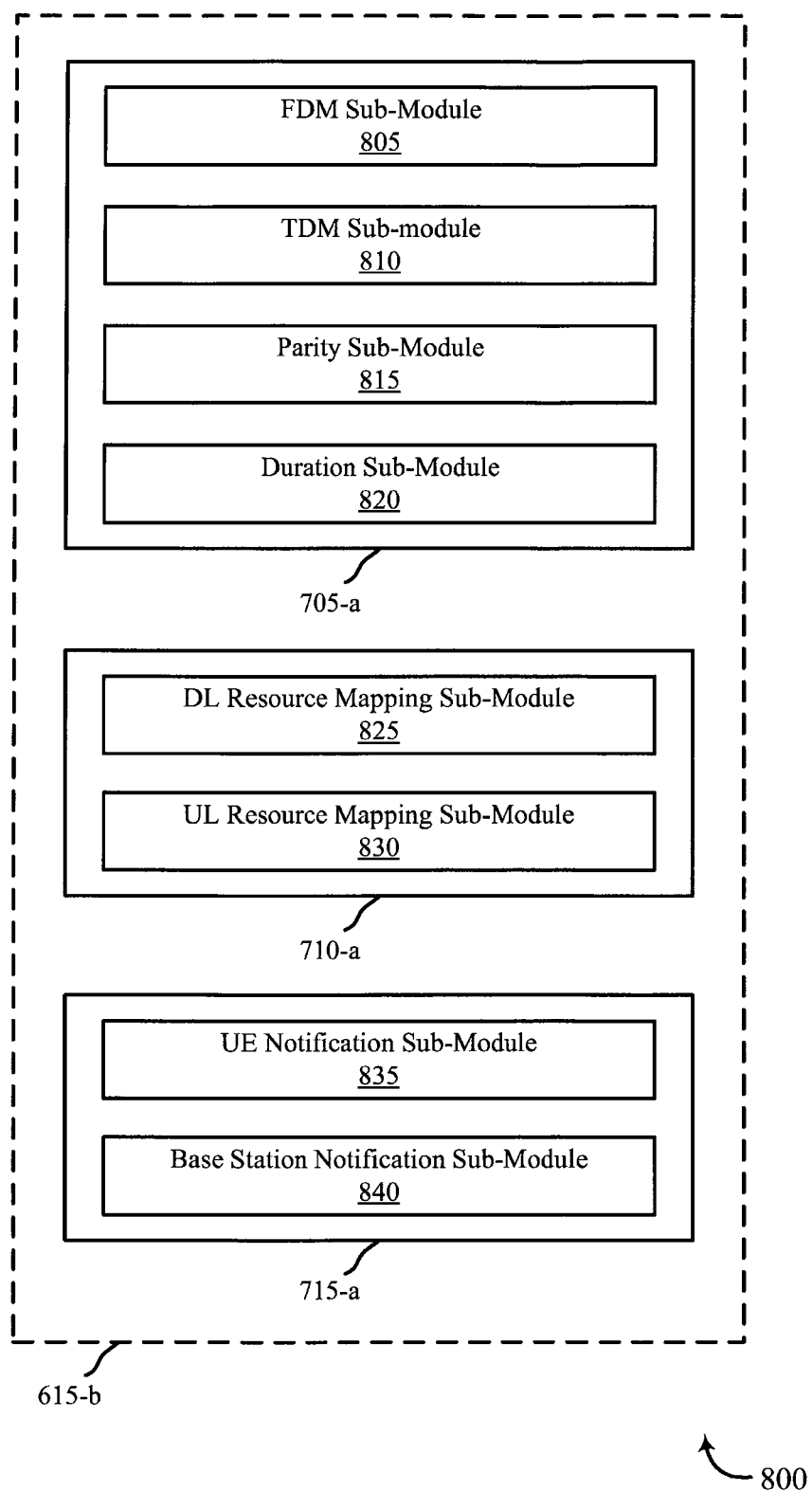
FIG. 8 shows a block diagram of a reallocation module configured for use in wireless communication, in accordance with aspects of the present disclosure.

FIG. 8 shows a block diagram 800 of a reallocation module 615-*b* for use in the devices of FIG. 6 or 7, in accordance with various examples. The reallocation module 615-*b* may be an example of one or more aspects of the reallocation modules 615, 615-*a* described above with reference to FIGS. 6 and 7. The reallocation module 615-*b* may include a separation module 705-*a*, a mapping module 710-*a*, and a notification module 715-*a*. The separation module 705-*a*, mapping module 710-*a*, and notification module 715-*a* may perform the functions of the respective modules shown and described above with reference to FIG. 7.

The separation module 705-*a* may include an FDM sub-module 805, a TDM sub-module 810, a parity sub-module 815, and/or a duration sub-module 820. The FDM sub-module 805 may be configured to reallocate a subset of resources using frequency division multiplexing. For example, the FDM sub-module 805 may be configured to separate remaining FDD UL resources from the identified subset of resources to be reallocated by one or more guard bands. The TDM sub-module 810 may be configured to reallocate a subset of resources using time division multiplexing. If the resources originally allocated for transmissions in the FDD UL band include a number of UL subframes, the TDM sub-module 810 may be configured to identify a subset of the FDD UL subframes for TDD DL transmissions. In some examples, the subset of FDD UL subframes may correspond to almost blank subframes (ABS).

The parity sub-module 815 may be configured to ensure that the parity of the number of resource blocks in an FDM reallocation is equal to the parity of the overall number of resource blocks in the original FDD UL band, as described above. The duration sub-module 820 may be configured to determine and/or set the duration of a specific or of all of the resource allocations in a system such as the wireless communication system 100, 200, and/or 350 in FIGS. 1, 3, and/or 3B. For example, the duration sub-module 820 may dynamically change the resource reallocations on a frame-by-frame basis, or may specify certain periods of time during which the reallocations will not change. For example, the reallocation may be based at least in part on a reconfiguration period. The reconfiguration period may be determined dynamically with a periodicity of 8 ms, 10 ms, 20 ms, 40 ms, and/or 80 ms, as indicated by higher layer signaling such as L1 signaling. In some cases, a reconfiguration period may be determined semi-statically by RRC signaling. For mixed UL/DL in one subframe, an update of UL/DL ratio may be performed on the subframe basis. In some examples, the identified subset of resources for the transmissions from the second base station may be reallocated on a subframe-by-subframe basis. For example, for mixed UL/DL in one subframe, the update of a UL/DL ratio may be performed on the subframe basis. The duration sub-module 820 may determine the timing of reallocation adjustments based at least in part on one or more of DL/UL traffic demands, QoS considerations, and so forth.

The mapping module 710-*a* may include DL resource mapping sub-module 825 and an UL resource mapping sub-module 830. The DL resource mapping sub-module 825 may be configured to map DL resources, including the subset of resources reallocated for use by a TDD DL channel. The UL resource mapping sub-module 830 may be configured to map UL resources, including the remaining FDD UL resources that are not reallocated for TDD DL transmissions and/or reallocated resources for use by TDD UL.

The notification module 715-*a* may include a UE notification sub-module 835, and/or a base station notification sub-module 840. The UE notification sub-module 835 may be configured to provide control signaling for UEs 115 impacted by the reallocation of resources, including by providing control signaling to a UE 115 that is to receive TDD DL data via the reallocated subset of resources and/or to UEs from which FDD UL resources are taken. The UE notification sub-module 835 may provide UE-specific RRC signaling, L1 signaling, and/or the like. The base station notification sub-module 840 may be configured to provide control signaling to one or more base stations 105 that are impacted by the reallocation of resources, including the base station 105 to which the resources were originally allocated and/or the base station 105 for which the resources are reallocated.

Figure 9:
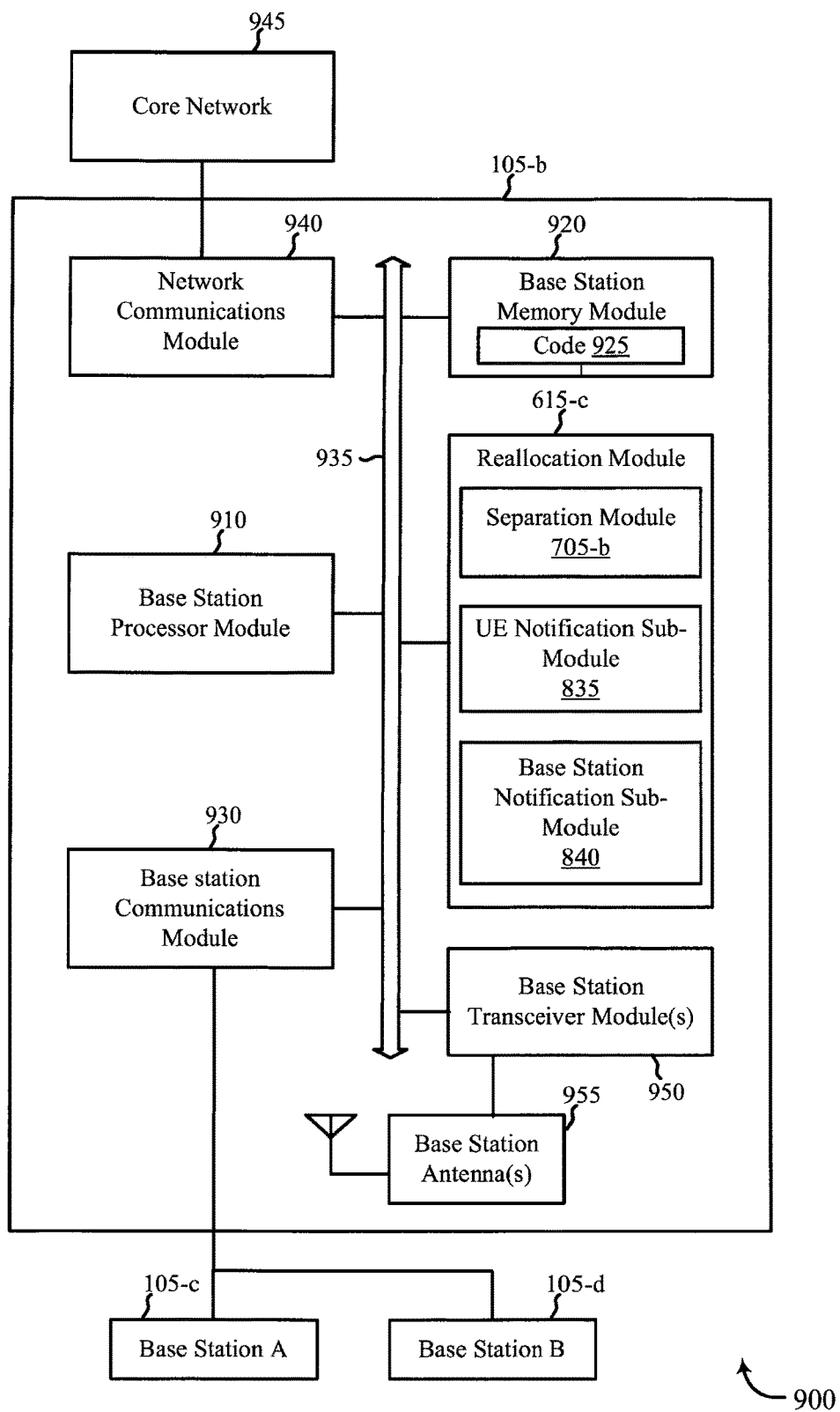
FIG. 9 shows a block diagram of a base station (e.g., a base station forming part or all of an eNB) for use in wireless communication, in accordance with aspects of the present disclosure.

FIG. 9 shows a block diagram 900 of a base station 105-*b* (e.g., a base station forming part or all of an eNB) for use in wireless communication, in accordance with various aspects of the present disclosure. In some examples, the base station 105-*b* may be an example of aspects of one or more of the base stations 105 described with reference to FIGS. 1 and 2 and/or aspects of one or more of the device 605 when configured as a base station, as described with reference to FIGS. 6 and 7.

The base station 105-*b* may include a base station processor module 910, a base station memory module 920, at least one base station transceiver module (e.g., represented by base station transceiver module(s) 950), at least one base station antenna (e.g., represented by base station antenna(s) 955), and/or a reallocation module 615-*c*. The base station 105-*b* may also include one or more of a base station communications module 930 and/or a network communications module 940. Each of these modules may be in communication with each other, directly or indirectly, over one or more buses 935.

The base station memory module 920 may include random access memory (RAM) and/or read-only memory (ROM). The base station memory module 920 may store computer-readable, computer-executable software/firmware code 925 including instructions that are configured to, when executed, cause the base station processor module 910 to perform various functions described herein related to wireless communication (e.g., reallocation of a subset of FDD UL resources to TDD DL transmissions, etc.). Alternatively, the computer-readable, computer-executable software/firmware code 925 may not be directly executable by the base station processor module 910 but be configured to cause the base station 105-*b* (e.g., when compiled and executed) to perform various of the functions described herein.

The base station processor module 910 may include an intelligent hardware device, e.g., a central processing unit (CPU), a microcontroller, an ASIC, etc. The base station processor module 910 may process information received through the base station transceiver module(s) 950, the base station communications module 930, and/or the network communications module 940. The base station processor module 910 may also process information to be sent to the base station transceiver module(s) 950 for transmission through the base station antenna(s) 955, to the base station communications module 930, for transmission to one or more other base stations 105-*c* and 105-*d*, and/or to the network communications module 940 for transmission to a core network 945, which may be an example of one or more aspects of the core network 130 described with reference to FIG. 1. The base station processor module 910 may handle, alone or in connection with the reallocation module 615-*c*, various aspects of reallocation resources from FDD UL resources to TDD DL resources.

The base station transceiver module(s) 950 may include a modem configured to modulate packets and provide the modulated packets to the base station antenna(s) 955 for transmission, and to demodulate packets received from the base station antenna(s) 955. The base station transceiver module(s) 950 may, in some examples, be implemented as one or more base station transmitter modules and one or more separate base station receiver modules. The base station transceiver module(s) 950 may support communications in a first radio frequency spectrum band and/or a second radio frequency spectrum band. The base station transceiver module(s) 950 may be configured to communicate bi-directionally, via the antenna(s) 955, with one or more UEs or apparatuses, such as one or more of the UEs 115 described with reference to FIGS. 1 and 2. The base station 105-*b* may, for example, include multiple base station antennas 955 (e.g., an antenna array). The base station 105-*b* may communicate with the core network 945 through the network communications module 940. The base station 105-*b* may also communicate with other base stations, such as the base stations 105-*c* and 105-*d*, using the base station communications module 930.

The base station reallocation module 615-*c* may be configured to perform and/or control some or all of the features and/or functions described with reference to FIGS. 6-8 related to the reallocation of resources. In some examples, the base station reallocation module 615-*c* may include a separation module 705-*b* configured to identify and reallocate resources originally allocated for FDD UL transmissions associated with the base station 105-*b* to TDD DL transmissions associated with a different base station, such as base station 105-*c* or base station 105-*d* in FIG. 9, or vice versa. The base station reallocation module 615-*c* may include a UE notification sub-module 835 configured to provide control signaling to a UE regarding the reallocation of resources. The reallocation module 615-*c* may include a base station notification sub-module 840, which may be configured to provide control signaling to another base station (e.g., one or both of base stations 105-*c*, 105-*d* in FIG. 9) regarding the reallocation of resources.

The reallocation module 615-*c*, or portions of the reallocation module 615-*c*, may include a processor, and/or some or all of the functions of the reallocation module 615-*c* may be performed by the base station processor module 910 and/or in connection with the base station processor module 910. In some examples, the reallocation module 615-*c* may be an example of the reallocation module 615 described with reference to FIGS. 6 and/or 7. In some cases, one or more of the components and/or modules of base station 105-*b* may be configured to perform operations described herein for flexible transmissions on one or more frequency division duplexing resources. For example, one or more of the components and/or modules of base station 105-*b* may be configured to perform operations shown in FIG. 11, operations shown in FIG. 12 and/or operations shown in FIG. 13.

Figure 10:
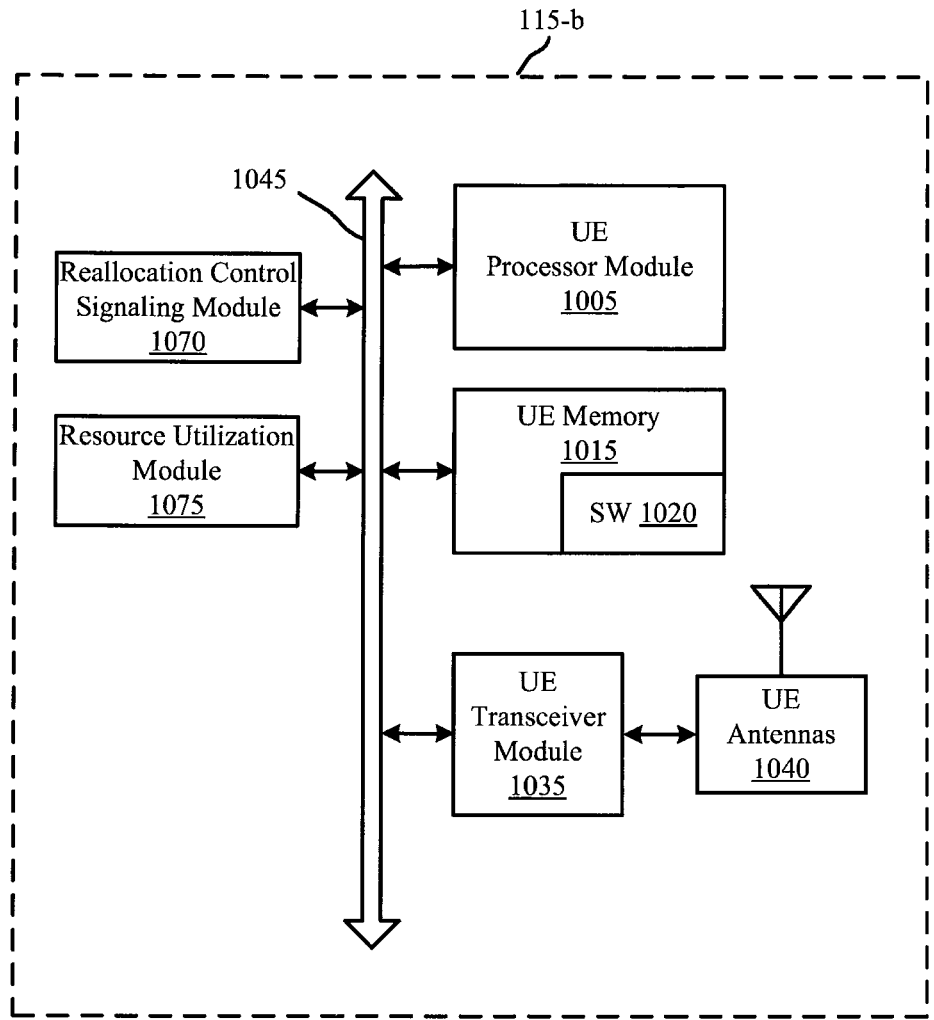
FIG. 10 shows a block diagram of an apparatus for use in wireless communication, in accordance with aspects of the present disclosure.

FIG. 10 shows a block diagram 1000 of a UE 115-*b* for use in wireless communication, in accordance with various examples. In some examples, the UE 115-*b* may be an example of aspects of one or more of the UEs 115 described with reference to FIGS. 1 and 2.

The UE 115-*b* may generally include components for bi-directional voice and data communications including components for transmitting communications and components for receiving communications. The UE 115-*b* may include one or more UE antenna(s) 1040, a UE transceiver module 1035, a UE processor module 1005, and UE memory 1015 (e.g., including computer-readable, computer-executable software/firmware code 1020), which each may communicate, directly or indirectly, with each other (e.g., via one or more UE buses 1045). The UE transceiver module 1035 may be configured to communicate bi-directionally, via the UE antenna(s) 1040 and/or one or more wired or wireless links, with one or more networks, as described above. For example, the UE transceiver module 1035 may be configured to communicate bi-directionally with base stations 105 described above with reference to FIGS. 1, 2 and 6-9. The UE transceiver module 1035 may include a modem configured to modulate the packets and provide the modulated packets to the UE antenna(s) 1040 for transmission, and to demodulate packets received from the UE antenna(s) 1040. While the UE 115-*b* may include a single UE antenna in some embodiments, the UE 115-*b* may have multiple UE antennas capable of concurrently transmitting and/or receiving multiple wireless transmissions in other embodiments. The UE transceiver module 1035 may be capable of concurrently communicating with one or more base stations 105 via multiple component carriers.

The UE 115-*b* may include a reallocation control signaling module 1070, which may be configured to receive control signaling relating to the reallocation of resources. The reallocation control signaling module 1070 may, for example, receive control signaling from a UE notification sub-module 835 of a base station 105 and/or core network 130. The UE 115-*b* may also include a resource utilization module 1075 configured to utilize reallocated resources if the resources are reallocated for its own use, or to not utilize the reallocated resources if the resources are reallocated for another UE's use.

The UE memory 1015 may include RAM and/or ROM. The UE memory 1015 may store computer-readable, computer-executable software/firmware code 1020 including instructions that are configured to, when executed, cause the UE processor module 1005 to perform various functions described herein (e.g., receive and process resource reallocation control signaling, etc.). Alternatively, the computer-readable, computer-executable software/firmware code 1020 may not be directly executable by the UE processor module 1005 but be configured to cause a computer (e.g., when compiled and executed) to perform functions described herein. The UE processor module 1005 may include an intelligent hardware device, e.g., a CPU, a microcontroller, an ASIC, etc. In some cases, one or more of the components and/or modules of UE 115-*b* may be configured to perform operations described herein for flexible transmissions on one or more frequency division duplexing resources. For example, one or more of the components and/or modules of UE 115-*b* may be configured to perform operations shown in FIG. 13.

Figure 11:
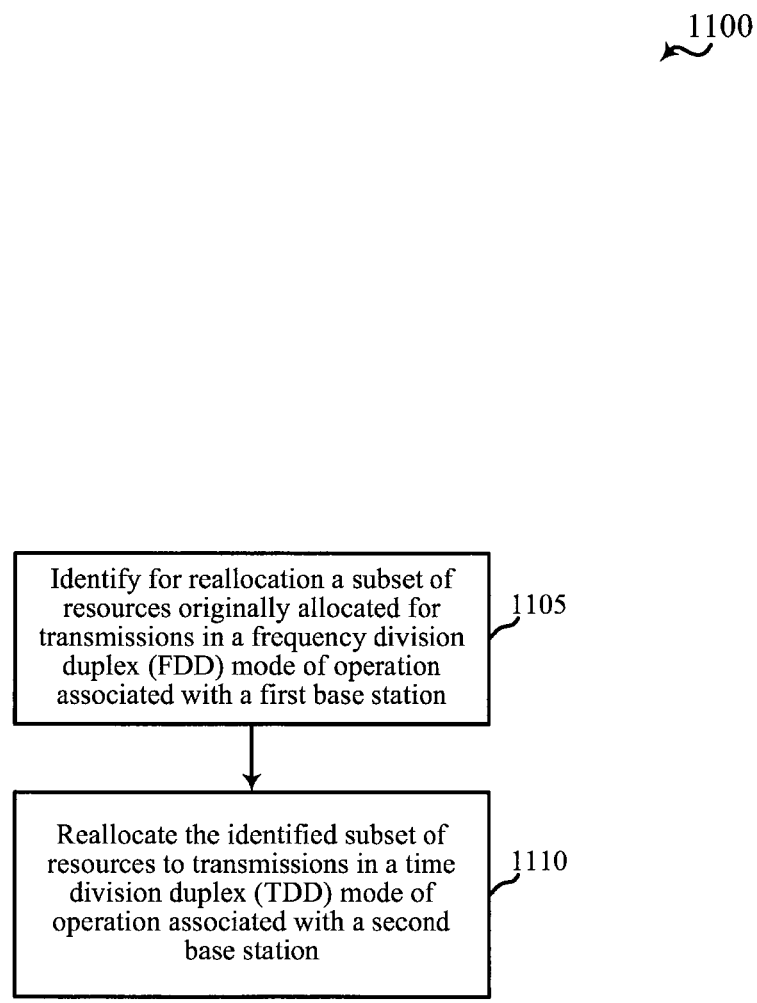
FIG. 11 is a flow chart illustrating an example of a method for wireless communication, in accordance with aspects of the present disclosure.

FIG. 11 is a flow chart illustrating an example of a method 1100 for wireless communication, in accordance with various aspects of the present disclosure. For clarity, the method 1100 is described below with reference to aspects of one or more of the base stations 105 and/or core networks 130 described with reference to FIGS. 1-9. In some examples, a base station 105 and/or core network 130 may execute one or more sets of codes to control functional elements to perform the functions described below. Additionally or alternatively, the base station 105 and/or the core network 130 may perform one or more of the functions described below using special-purpose hardware.

At block 1105, the method 1100 may include identifying for reallocation a subset of resources originally allocated for transmissions in a FDD mode of operation associated with a first base station. At block 1110, the method 1100 may include reallocating the identified subset of resources for transmissions in a TDD mode of operation associated with a second base station. In some examples, the second base station may be a pico eNodeB operating on a same carrier frequency as the first base station. Reallocating the identified subset of resources for transmissions in the TDD mode of operation associated with the second base station may include reallocating the identified subset of resources for DL transmissions in the TDD mode of operation associated with the second base station. In some examples, the identified subset of resources may include a center portion of an FDD UL bandwidth.

The operations at blocks 1105 and 1110 may be performed using one or more of the reallocation modules 615, the separation module 705, and/or the mapping module 710 as described above.

Thus, the method 1100 may provide for wireless communication. It should be noted that the method 1100 is just one implementation and that the operations of the method 1100 may be rearranged or otherwise modified such that other implementations are possible.

Figure 12:
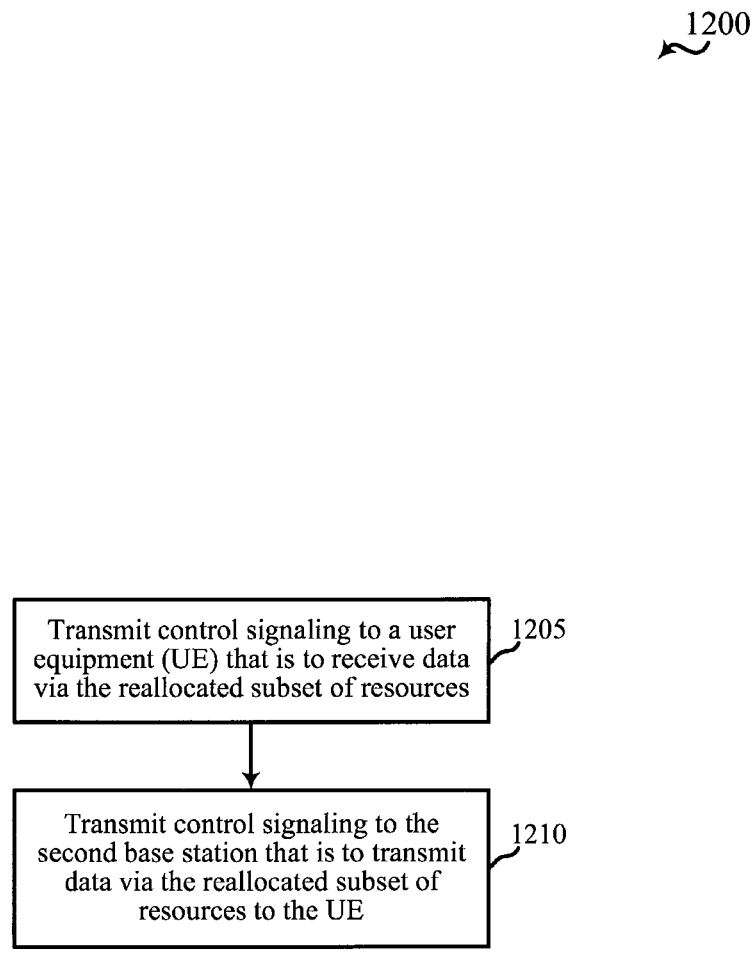
FIG. 12 is a flow chart illustrating an example of another method for wireless communication, in accordance with aspects of the present disclosure.

FIG. 12 is a flow chart illustrating an example of a method 1200 for wireless communication, in accordance with various aspects of the present disclosure. For clarity, the method 1200 is described below with reference to aspects of one or more of the base stations 105 and/or core networks 130 described with reference to FIGS. 1-9. In some examples, a base station 105 and/or core network 130 may execute one or more sets of codes to control functional elements to perform the functions described below. Additionally or alternatively, the base station 105 and/or the core network 130 may perform one or more of the functions described below using special-purpose hardware.

At block 1205, the method 1200 may include transmitting control signaling to a UE that is to receive data via the reallocated subset of resources. In aspects, at block 1210 the method may include transmitting control signaling to the second base station that is to transmit data via the reallocated subset of resources to the UE.

The operations at blocks 1205 and 1210 may be performed using the UE notification sub-module 835 and the base station notification sub-module 840, respectively, as described above with reference to FIG. 8. In some embodiments, the operations in method 1200 may be performed following the operations in method 1100 shown in FIG. 11.

Thus, the method 1200 may provide for wireless communication. It should be noted that the method 1200 is just one implementation and that the operations of the method 1200 may be rearranged or otherwise modified such that other implementations are possible.

Figure 13:
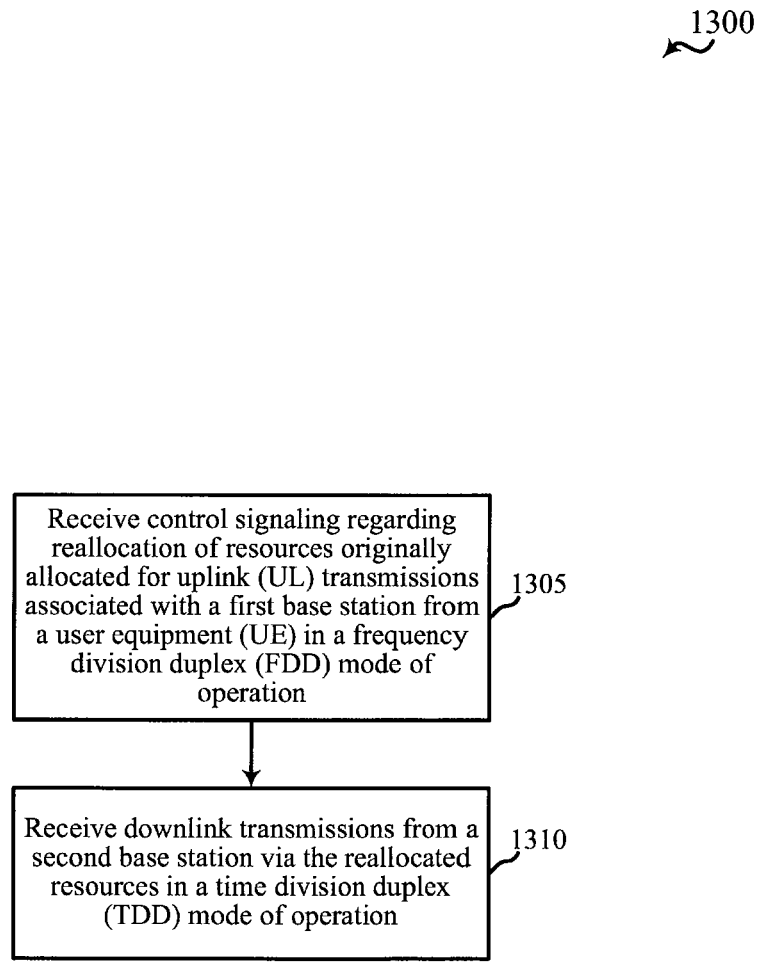
FIG. 13 is a flow chart illustrating an example of another method for wireless communication, in accordance with aspects of the present disclosure.

FIG. 13 is a flow chart illustrating an example of a method 1300 for wireless communication, in accordance with various aspects of the present disclosure. For clarity, the method 1300 is described below with reference to aspects of one or more of the UEs 115 described with reference to FIGS. 1-3 and/or 10. In some examples, a UE 115 may execute one or more sets of codes to control functional elements to perform the functions described below.

At block 1305, the method 1300 may include receiving control signaling regarding the reallocation of resources originally allocated for transmissions in a FDD mode of operation associated with a first base station over which downlink transmissions will be received by the UE 115. The control signaling may include RRC signaling and/or L1 signaling. In some examples, the second base station may be associated with a TDD cell configured to use resources on FDD UL frequency band utilizing UL spectrum for DL transmission. In a carrier aggregation implementation, where an FDD DL is configured for a PCC, the second base station (e.g., TDD cell) may be configured as an SCell to provide additional radio resources for DL transmission. If an FDD DL traffic is bursty, the first base station, second base station and/or the like may configure additional resources for use in DL transmission. In some embodiments, the TDD SCell may be activated or deactivated by MAC signaling. If the TDD SCell is activated, the UE may monitor L1 signaling for locations of DL subframes in a UL frequency band per radio frame, for example.

At block 1310, the method 1300 may include receiving downlink transmissions from a second base station via the reallocated resources in a TDD mode of operation. The reallocated resources may include a center portion of a bandwidth originally allocated for FDD UL transmissions from the first base station.

The operations at blocks 1305 and 1310 may be performed using the reallocation control signaling module 1070 and the resource utilization module 1075, respectively, as described above with reference to FIG. 10.

Thus, the method 1300 may provide for wireless communication. It should be noted that the method 1300 is just one implementation and that the operations of the method 1300 may be rearranged or otherwise modified such that other implementations are possible.

In some examples, aspects from two or more of the methods 1100, 1200, 1300 may be combined. It should be noted that the methods 1100, 1200, 1300 are just example implementations, and that the operations of the methods 1100, 1200, 1300 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, }, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), flash memory, compact disk (CD)-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication by a network entity, comprising:
   determining a periodicity for a reconfiguration period and a subframe configuration of the reconfiguration period associated with a time division duplex (TDD) mode of operation;
   identifying a subset of resources comprising at least a portion of an uplink (UL) bandwidth in a frequency division duplex (FDD) mode of operation originally allocated for transmissions associated with a first base station;
   identifying, based at least in part on a defined resource allocation for the FDD mode of operation coinciding with the reconfiguration period, that the subset of resources is not being used during a subframe of the reconfiguration period for any of physical uplink shared channel (PUSCH), sounding reference signal (SRS), or physical random access channel (PRACH) transmissions with the first base station; and
   reallocating, during the subframe of the reconfiguration period, the identified subset of resources as downlink (DL) resources in the TDD mode of operation for transmissions by a second base station, the reallocating being based at least in part on the identified subset of resources not being used for any of PUSCH, SRS, or PRACH transmissions with the first base station, the periodicity for the reconfiguration period, the subframe configuration of the reconfiguration period, and the identified subset of resources for reallocation as DL resources being indicated to a user equipment (UE) via control signaling different from signaling for a master information block.

2. The method of claim 1, wherein the second base station comprises a pico eNodeB operating on a same carrier frequency as the first base station.

3. The method of claim 1, further comprising:
   employing one or more guard bands to separate remaining UL resources allocated for transmissions in the FDD mode of operation associated with the first base station from the identified subset of resources for reallocation as DL resources.

4. The method of claim 1, further comprising:
   dynamically reallocating additional resources originally allocated for UL transmissions in the FDD mode of operation associated with the first base station for DL transmissions in the TDD mode of operation associated with the second base station based on a changing traffic demand.

5. The method of claim 1, further comprising:
   transmitting control signaling to the UE that is to receive data via the identified subset of resources for reallocation as DL resources.

6. The method of claim 5, wherein the control signaling is transmitted using at least one of radio resource control (RRC) signaling and Layer 1 signaling.

7. The method of claim 1, further comprising:
   causing at least one of CRS, CSI-RS, PDCCH or PDSCH of the second base station to be mapped to the identified subset of resources for reallocation as DL resources.

8. The method of claim 1, wherein the subset of resources originally allocated for transmissions in the FDD mode of operation associated with the first base station comprises a plurality of reserved subframes, and the identified subset of resources comprises a reserved subframe of the plurality of reserved subframes.

9. The method of claim 8, wherein the reserved subframes correspond to almost blank subframes (ABS) associated with the first base station.

10. The method of claim 8, wherein one or more portions of the identified subset of resources are reallocated in the UL bandwidth of the first base station based on at least one of a period of time, UL control requirements, UL traffic requirements, DL control requirements, DL traffic requirements, and quality of service requirements.

11. The method of claim 1, wherein the identified subset of resources originally allocated for transmissions in the FDD mode of operation associated with the first base station includes one or more symbols associated with an UL subframe originally allocated for transmissions associated with the first base station.

12. The method of claim 11, wherein the identified subset of resources originally allocated for transmissions in the FDD mode of operation associated with the first base station includes one or more symbols associated with one UL subframe, the identifying and reallocating are performed on a subframe-by-subframe basis, and the reallocating is based on at least one of UL control requirements, UL traffic requirements, DL control requirements, DL traffic requirements, and quality of service requirements.

13. The method of claim 1, wherein the identified subset of resources for reallocation as DL resources for the transmissions from the second base station forms an extension carrier of a secondary component carrier for use with a legacy carrier.

14. The method of claim 1, wherein the second base station comprises an eNodeB operating on adjacent carrier frequency as the first base station, and the reallocation is based on a desired guard band to separate transmissions associated with the second base station in a TDD mode of operation from transmissions associated with the first base station.

15. The method of claim 1, wherein the second base station comprises an eNodeB operating on the same carrier frequency as the first base station or an eNodeB operating on an adjacent carrier frequency as the first base station.

16. An apparatus for wireless communication, comprising:
   a processor;
   memory coupled with the processor; and
   one or more instructions stored in the memory, the one or more instructions being executable by the processor to:
      determine a periodicity for a reconfiguration period and a subframe configuration of the reconfiguration period associated with a time division duplex (TDD) mode of operation;
      identify a subset of resources comprising at least a portion of an uplink (UL) bandwidth in a frequency division duplex (FDD) mode of operation originally allocated for transmissions associated with a first base station;
      identify, based at least in part on a defined resource allocation for the FDD mode of operation coinciding with the reconfiguration period, that the subset of resources is not being used during a subframe of the reconfiguration period for any of physical uplink shared channel (PUSCH), sounding reference signal (SRS), or physical random access channel (PRACH) transmissions with the first base station; and
      reallocate, during the reconfiguration period, the identified subset of resources as downlink (DL) resources in the TDD mode of operation for transmissions by a second base station, the reallocating being based at least in part on the identified subset of resources not being used for any of PUSCH, SRS, or PRACH transmissions with the first base station, the periodicity for the reconfiguration period, the subframe configuration of the reconfiguration period, and the identified subset of resources for reallocation as DL resources being indicated to a user equipment (UE) via control signaling different from signaling for a master information block.

17. The apparatus of claim 16, wherein the memory further comprises one or more instructions being executable by the processor to:
   employ one or more guard bands to separate remaining UL resources allocated for transmissions in the FDD mode of operation associated with the first base station from the identified subset of resources for reallocation as DL resources.

18. The apparatus of claim 16, wherein the memory further comprises one or more instructions being executable by the processor to:
   transmit control signaling to the UE that is to receive data via the identified subset of resources for reallocation as DL resources.

19. The apparatus of claim 16, wherein the subset of resources originally allocated for transmissions in the FDD mode of operation associated with the first base station comprise a plurality of reserved subframes, and the identified subset of resources comprises a reserved subframe of the plurality of reserved subframes.

20. The apparatus of claim 19, wherein the memory further comprises one or more instructions being executable by the processor to:
   reallocate one or more portions of the identified subset of resources in the UL bandwidth of the first base station based on at least one of a period of time, UL control requirements, UL traffic requirements, DL control requirements, DL traffic requirements, and quality of service requirements.

21. The apparatus of claim 16, wherein the identified subset of resources originally allocated for transmissions in the FDD mode of operation associated with the first base station includes one or more symbols associated with an UL subframe originally allocated for transmissions associated with the first base station.

22. A method for wireless communication by a user equipment (UE), comprising:
   receiving control signaling different from signaling for a master information block comprising a periodicity for a reconfiguration period, a subframe configuration of the reconfiguration period associated with a time division duplex (TDD) mode of operation, and resources for reallocation as downlink (DL) resources in the TDD mode of operation, the resources for reallocation comprising at least a portion of an uplink (UL) bandwidth in a frequency division duplex (FDD) mode of operation previously utilized for transmissions by a first base station but not being used for any of physical uplink shared channel (PUSCH), sounding reference signal (SRS), or physical random access channel (PRACH) transmissions with the first base station in a current transmission interval, wherein the resources for reallocation are identified based at least in part on a defined resource allocation for the FDD mode of operation coinciding with the reconfiguration period; and
   receiving downlink (DL) transmissions from a second base station via the resources for reallocation during a subframe of the reconfiguration period, wherein the DL transmissions are received from the second base station in the TDD mode of operation based at least in part on receiving the control signaling, wherein the resources for reallocation are reallocated during the subframe of the reconfiguration period and are reallocated based at least in part on the resources for reallocation not being used for any of PUSCH, SRS, or PRACH transmissions with the first base station.

23. The method of claim 22, wherein the resources previously utilized for transmissions associated with the first base station comprise a center portion of an UL bandwidth for FDD UL transmissions to the first base station from the UE.

24. An apparatus for wireless communication, comprising:
   a processor;
   memory coupled with the processor; and
   one or more instructions stored in the memory, the one or more instructions being executable by the processor to:
      receive control signaling different from signaling for a master information block comprising a periodicity for a reconfiguration period, a subframe configuration of the reconfiguration period associated with a time division duplex (TDD) mode of operation, and resources for reallocation as downlink (DL) resources in the TDD mode of operation, the resources for reallocation comprising at least a portion of an uplink (UL) bandwidth in a frequency division duplex (FDD) mode of operation previously utilized for transmissions by a first base station but not being used for any of physical uplink shared channel (PUSCH), sounding reference signal (SRS), or physical random access channel (PRACH) transmissions with the first base station in a current transmission interval, wherein the resources for reallocation are identified based at least in part on a defined resource allocation for the FDD mode of operation coinciding with the reconfiguration period; and receive downlink (DL) transmissions from a second base station via the resources for reallocation during a subframe of the reconfiguration period, wherein the DL transmissions are received from the second base station in the TDD mode of operation based at least in part on receiving the control signaling, wherein the resources for reallocation are reallocated during the reconfiguration period and are reallocated based at least in part on the resources for reallocation not being used for any of PUSCH, SRS, or PRACH transmissions with the first base station.

* * * * *